(12) United States Patent
Huynh et al.

(10) Patent No.: US 10,782,886 B2
(45) Date of Patent: Sep. 22, 2020

(54) SEMICONDUCTOR DEVICE, DATA PROCESSING SYSTEM, DATA READING METHOD, AND DATA READING PROGRAM

(71) Applicant: RENESAS ELECTRONICS CORPORATION, Tokyo (JP)

(72) Inventors: Nhat Van Huynh, Tokyo (JP); Seiji Mochizuki, Tokyo (JP); Katsushige Matsubara, Tokyo (JP); Toshiyuki Kaya, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 7 days.

(21) Appl. No.: 16/128,310

(22) Filed: Sep. 11, 2018

(65) Prior Publication Data

US 2019/0146683 A1    May 16, 2019

(30) Foreign Application Priority Data

Nov. 14, 2017  (JP) .................................. 2017-218753

(51) Int. Cl.
*G06F 12/00* (2006.01)
*G06F 3/06* (2006.01)
*G06T 1/60* (2006.01)
*H04N 19/423* (2014.01)
*H04N 1/40* (2006.01)

(52) U.S. Cl.
CPC .......... *G06F 3/0611* (2013.01); *G06F 3/0659* (2013.01); *G06F 3/0679* (2013.01); *G06T 1/60* (2013.01); *H04N 19/423* (2014.11); *H04N 1/40* (2013.01)

(58) Field of Classification Search
CPC .... G06F 3/0611; G06F 3/0679; G06F 3/0659; H04N 1/40; H04N 19/423; G06T 1/60
See application file for complete search history.

(56) References Cited

U.S. PATENT DOCUMENTS

| 6,285,790 B1 * | 9/2001 | Schwartz | ............... H04N 1/644 382/234 |
| 8,428,137 B2 | 4/2013 | Nitta et al. | |
| 2012/0179663 A1 * | 7/2012 | Haudenschild | ......... H04L 67/10 707/706 |

(Continued)

FOREIGN PATENT DOCUMENTS

| EP | 1 345 125 A2 | 9/2003 |
| EP | 1 931 035 A1 | 6/2008 |
| JP | 2009-071569 A | 4/2009 |

OTHER PUBLICATIONS

Extended European Search Report issued in corresponding European Patent Application No. 18196132.7-1209, dated Mar. 28, 2019.

*Primary Examiner* — Daniel D Tsui
(74) *Attorney, Agent, or Firm* — McDermott Will & Emery LLP

(57) ABSTRACT

To provide a semiconductor device which suppresses a delay in processing. The semiconductor device is equipped with a plurality of read units which read data stored across a plurality of banks in a memory having the banks, and an access method managing section which, when one of the read units reads the data, determines a read start bank number being a bank number to start reading according to operation situations of the read units excepting the one read unit, and instructs the determined read start bank number to the one read unit.

18 Claims, 13 Drawing Sheets

(56) References Cited

U.S. PATENT DOCUMENTS

2016/0127598 A1* 5/2016 Yaguchi ............... H04N 1/2112
          348/231.99
2018/0239557 A1* 8/2018 Yang ....................... G06F 3/061

* cited by examiner

SEMICONDUCTOR DEVICE, DATA PROCESSING SYSTEM, DATA READING METHOD, AND DATA READING PROGRAM

CROSS-REFERENCE TO RELATED APPLICATIONS

The disclosure of Japanese Patent Application No. 2017-218753 filed on Nov. 14, 2017 including the specification, drawings and abstract is incorporated herein by reference in its entirety.

BACKGROUND

The present invention relates to a semiconductor device, a data processing system, a data reading method, and a data reading program.

An image processing device or the like which performs processing for synthesizing a plurality of images input thereto may perform a plurality of processing in parallel while referring to data stored in the same memory bank in some cases. In such a case, when a plurality of processing systems access the reference data on the same memory bank simultaneously, memory bank conflict may occur. There have been proposed various devisals for avoiding such bank conflict which leads to a delay in processing time.

There has been proposed in Patent Document 1, a technology of avoiding bank conflict where pixel data of a plurality of lines read from a reference image memory exist in the same bank. According to such a proposal, a motion searching device in moving image encoding precedingly reads out pixel data of one line by a conflict bank pre-read control unit and holds the pixel data up to its input timing to a programmable element array unit by a read data holding circuit.

RELATED ART DOCUMENTS

Patent Document

[Patent Document 1] Japanese Unexamined Patent Publication Laid-Open No. 2009-71569

SUMMARY

However, the above-described motion searching device does not make a decision as to whether bank conflict occurs, thereoutside. Therefore, in such a configuration that such a device is arranged in plural form, a plurality of memory read units access a common memory. Thus, in such a case, it is not possible to avoid the bank conflict.

Other objects and novel features of the present invention will become apparent from the description of the present specification and the accompanying drawings.

According to one aspect of the present invention, there is provided a semiconductor device including:

a plurality of read units which read data stored in a memory having a plurality of banks across the banks; and an access method managing section which, when one of the read units reads the data, determines a read start bank number being a bank number to start reading according to operation situations of the read units excepting the one read unit, and instructs the determined read start bank number to the one read unit.

According to another aspect of the present invention, there is provided a data reading method including the steps of:

providing a plurality of read units which read data stored in a memory having a plurality of banks across the banks;

when one of the read units reads the data, determining a read start bank number being a bank number to start reading according to operation situations of the read units excepting the one read unit; and instructing the determined read start bank number to the one read unit.

According to a further aspect of the present invention, there is provided a data reading program including the steps of:

providing a plurality of read units which read data stored in a memory having a plurality of banks across the banks;

when one of the read units reads the data, determining a read start bank number being a bank number to start reading according to operation situations of the read units excepting the one read unit; and instructing the determined read start bank number to the one read unit.

According to the one aspect, there can be provided a semiconductor device which suppresses a delay in processing.

DETAILED DESCRIPTION

Figure 1:
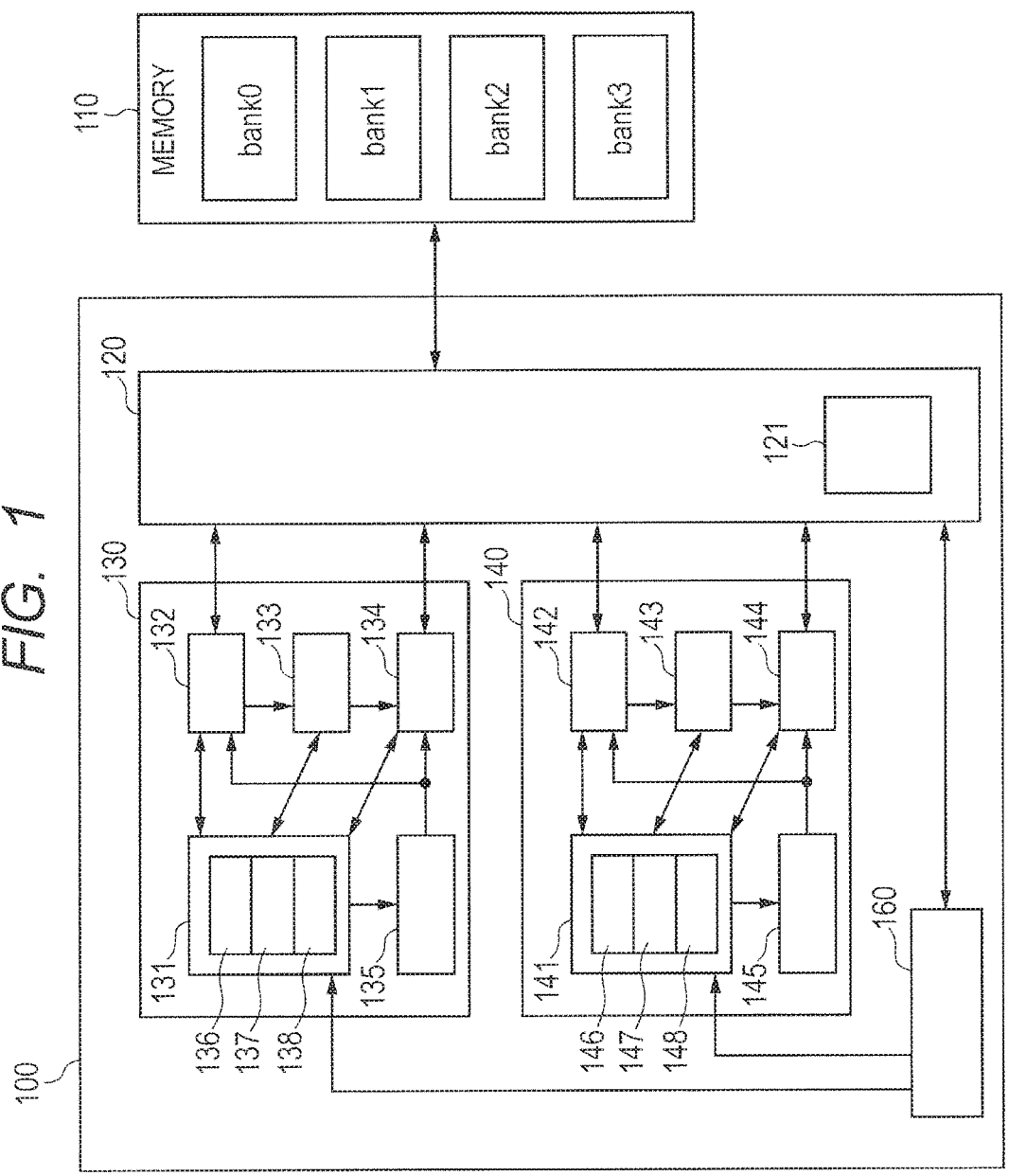
FIG. 1 is a block diagram of a semiconductor device according to an embodiment 1.

Embodiments will hereinafter be described with reference to the accompanying drawings. Incidentally, since the drawings are simplified, they are not to be construed narrowly in light of the technical scope of the embodiments as a basis for description of the drawings. Further, the same elements are respectively denoted by the same reference numerals, and their dual description will be omitted.

The invention will be described by being divided into a plurality of sections or embodiments whenever circumstances require it for convenience in the following embodiments. However, unless otherwise specified in particular, they are not irrelevant to one another. One thereof has to do with modifications, applications, detailed descriptions or supplementary explanations, etc. of some or all of the other. Also, when reference is made to the number of elements or the like (including the number of pieces, numerical values, quantity, range, etc.) in the following embodiments, the number thereof is not limited to a specific number and may be greater than or less than or equal to the specific number except for where otherwise specified in particular and definitely limited to the specific number in principle, etc.

Further, in the following embodiments, components (also including operation steps, etc.) employed therein are not always essential except for where otherwise specified in particular and considered to be definitely essential in principle, etc. Similarly, when reference is made to the shapes or positional relations and the like of the components or the like in the following embodiments, they will include ones substantially analogous or similar to their shapes or the like except for where otherwise specified in particular and considered not to be definitely so in principle, etc. This is similarly applied even to the above-described numbers and the like (including the number of pieces, numerical values, quantity, range, etc.).

For clarity of explanation, the following description and drawings have been appropriately omitted and simplified. Further, the respective elements described in the drawings as functional blocks which perform various processing can be configured by CPUs, memories or other circuits in terms of hardware, and are realized by programs loaded in memories or the like in terms of software. Accordingly, it will be understood by those skilled in the art that these functional blocks can be realized in various forms by only hardware, only software or their combination. They are not limited to any of them. Incidentally, in the respective drawings, the same elements are respectively denoted by the same reference numerals, and their dual description will be omitted as needed.

Further, the above-described programs are stored using various types of non-transitory computer readable mediums and can be supplied to a computer. The non-transitory computer readable mediums include various types of substantial recording mediums. Examples of the non-transitory computer readable mediums include a magnetic recording medium (e.g., flexible disk, magnetic tape, hard disk drive), an optical magnetic recording medium (e.g., optical magnetic disk), a CD-ROM (Read Only Memory) CD-R, a CD-R/W, and a semiconductor memory (e.g., mask ROM, PROM (Programmable ROM), EPROM (Erasable PROM), flash ROM, RAM (Random Access Memory)). Further, the programs may be supplied to the computer by various types of transitory computer readable mediums. Examples of the transitory computer readable mediums include an electric signal, an optical signal, and an electromagnetic wave. The transitory computer readable mediums are capable of supplying programs to the computer through a wired communication path such as an electric wire and an optical fiber or the like, or a wireless communication path.

Embodiment 1

An embodiment 1 will hereinafter be described while referring to the accompanying drawings.

A semiconductor device illustrated in FIG. 1 will first be described. FIG. 1 is a block diagram of the semiconductor device according to the embodiment 1. The semiconductor device 100 is mounted in an in-vehicle system having a camera such as a car navigation system, an automatic driving system or the like. The semiconductor device 100 has a function of reading a plurality of image data stored in a memory 110, performing synthetic processing of the read image data and writing the synthetic processed image data into the memory 110.

The synthetic processing executed by the semiconductor device 100 is processing for synthesizing icon or the like with map data generated by an in-vehicle navigation system, for example. Further, the synthetic processing executed by the semiconductor device 100 also includes processing for performing filter processing or the like on image data acquired by an in-vehicle camera, for example. In such synthetic processing, image data utilized with the map data or the like as the background is called a master image, whereas image data such as an icon to be synthesized with the master image is called a slave image. Further, image data obtained by synthesizing the master image and the slave image is referred to as a synthetic image. That is, the images to be input to the semiconductor device 100 are the master and slave images. The semiconductor device 100 outputs the synthetic image therefrom.

The semiconductor device 100 has a memory controller 120, a first image processing section 130, a second image processing section 140, and a CPU 160 as a main configuration.

The memory controller 120 mainly has a function of reading information stored in the memory 110 or writing information into the memory 110. For example, when the memory 110 is a DRAM (Dynamic Random Access Memory), the memory controller 120 converts a logical address instructed by the semiconductor device into a physical address of the memory 110 and accesses data of the memory 110 while switching a row number and a column number in the memory 110. The memory controller 120 is connected to the first image processing section 130, the second image processing section 140, and the CPU 160. Further, the memory controller 120 has a memory configuration information storage unit 121. When the information of the memory 110 is read, the memory controller 120 reads the information of the memory 110 in response to an instruction from each configuration connected thereto and outputs the so-read information to each configuration. When the information is written into the memory 110, the memory controller 120 receives information from each configuration connected thereto and writes the received information into the memory 110.

The memory configuration information storage unit 121 stores configuration information of the memory 110 therein. The configuration information of the memory 110 includes, for example, the number of banks, row sizes, logical addresses and the like in the memory 110. The memory configuration information storage unit 121 provides the first image processing section 130 and the second image processing 140 with the configuration information of the memory 110.

The first image processing section 130 performs synthetic processing for synthesizing a plurality of image data, based on information received from the CPU 160. In the synthetic processing, the first image processing section 130 acquires a plurality of image data through the memory controller 120 and synthesizes the acquired image data, and outputs the synthesize image data to the memory controller 120. The first image processing section 130 has a register unit 131, a read unit 132, a synthetic processing unit 133, a write unit 134, and a start-up managing unit 135.

The register unit 131 is a storage unit which receives the information for determining the operation of the first image processing section 130 from the CPU 160 and stores the received information therein. Further, the register unit 131 is connected to the start-up managing unit 135 and provides the information stored in the register unit 131. The register unit 131 has an access method register 136, an operation register 137, and an image information register 138. The details of these configurations included in the register unit 131 will be described later together with the details of the read unit 132 and the write unit 134.

The read unit 132 mainly has a function of reading a plurality of image data stored in the memory 110 through the memory controller 120 and outputting the read image data to the synthetic processing unit 133.

Figure 2:
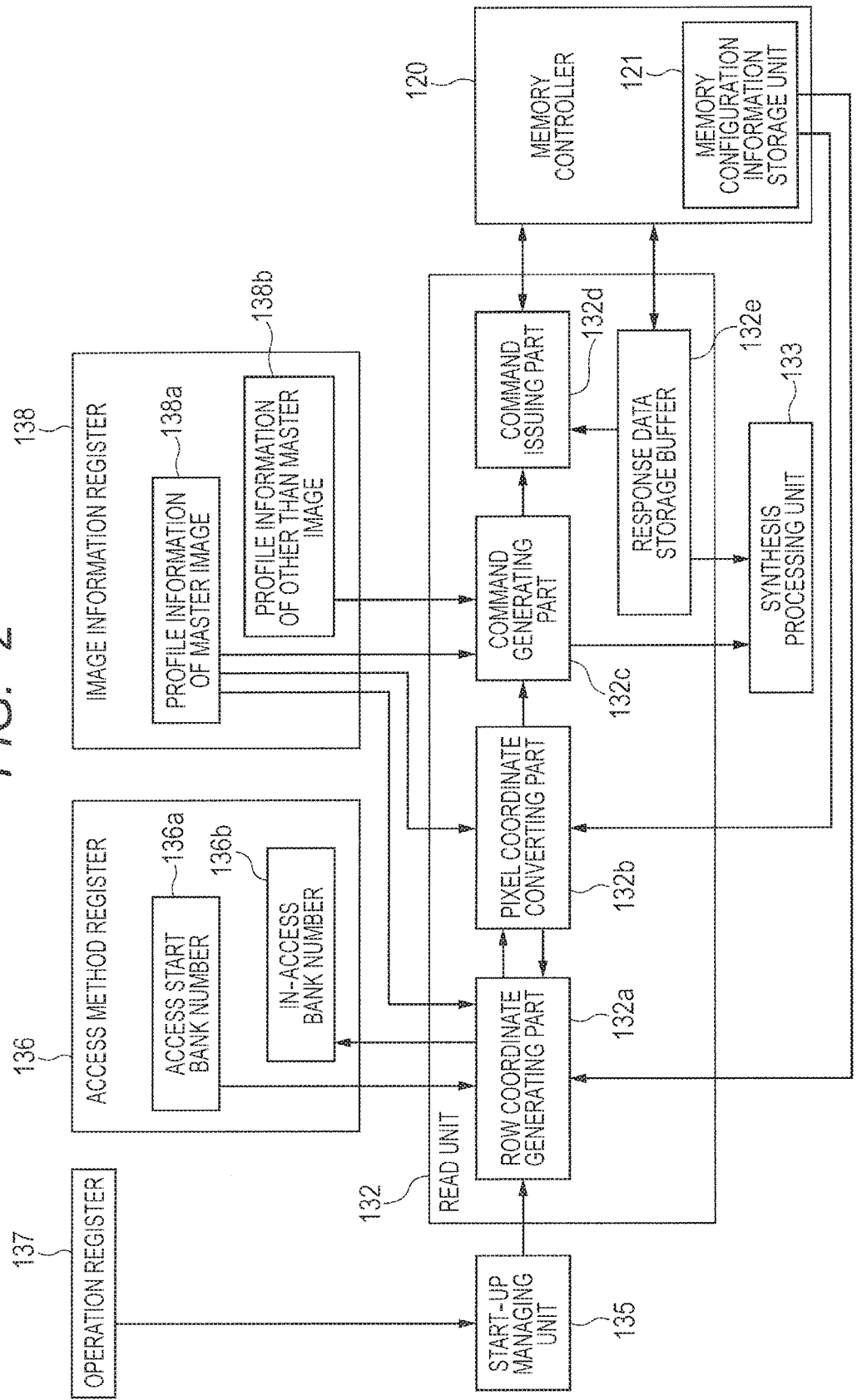
FIG. 2 is a block diagram for describing the function of a read unit 132.

The details of the read unit 132 will be described here while referring to FIG. 2. FIG. 2 is a block diagram for describing the function of the read unit 132. The read unit 132 is connected to the start-up managing unit 135, the access method register 136, the memory configuration information storage unit 121, the image information register 138, the memory controller 120, and the synthetic processing unit 133.

Further, the read unit 132 has a row coordinate generating part 132a, a pixel coordinate converting part 132b, a command generating part 132c, a command issuing part 132d, and a response data storage buffer 132e.

Upon start-up of the read unit 132, the start-up managing unit 135 detects operation information such as an operation start flag or the like stored in the operation register 137. The start-up managing unit 135 starts up the read unit 132 when detecting the operation information.

When the read unit 132 receives a start-up instruction therein, the row coordinate generating part 132a generates a row coordinate for starting reading. Here, the row coordinate is a coordinate including bank and row numbers of the memory with the information stored therein. The row coordinate generating part 132a receives an access start bank number 136a from the access method register 136. The access start bank number 136a is information written from the CPU 160. The CPU 160 determines the value of the access start bank number 136a of the read unit 132 according to the configuration information of the memory 110 and the operation situation of the second image processing section 140. When the value of the access start bank number 136a of the read unit 132 is not the same as an in-access bank number of the second image processing section 140, bank conflict is suppressed. Further, the row coordinate generating part 132a receives profile information 138a of a master image from the image information register 138. The profile information 138a of the master image includes a read start logical address for the master image to start reading. The read start logical address is a logical address at which the recording of image data is started, and is one set in advance by the CPU 160. When the row coordinate generating part 132a receives the access start bank number 136a and the read start logical address therein, the row coordinate generating part 132a converts them into row coordinates and outputs the same to the pixel coordinate converting part 132b. Subsequently, the row coordinate generating part 132a increments a row number included in the generated row coordinates and sequentially outputs the same to the pixel coordinate converting part 132b. Thus, the row coordinate generating part 132a generates row coordinates corresponding to an array of physical addresses of the memory with the row coordinate corresponding to the read start logical address of the master image as a starting point.

That is, the row coordinate generating part 132a determines the row coordinates according to the operation situation of the second image processing section and the read start logical address of the image data to be read.

Further, the row coordinate generating part 132a receives bank transition information from the pixel coordinate converting part 132b. The bank transition information is information for instructing incrementing of a bank number included in the row coordinates. The row coordinate generating part 132a increments the bank number of the row coordinates according to the received bank transition information. Further, the access method register 136 stores the updated bank number as an in-access bank number 136b. The in-access bank number 136b is read by the CPU 160 and referred to upon determining the access start bank number of the second image processing section 140.

When the pixel coordinate converting part 132b receives the row coordinates from the row coordinate generating part 132a, the pixel coordinate converting part 132b converts the received row coordinates into pixel coordinates and outputs the pixel coordinates of the image data to be read to the command generating part 132c. Here, the pixel coordinates are logical addresses arranged in accordance with the definition of the number of pixels of X and Y coordinates of the image data and the number of bits of a color depth of each pixel. The pixel coordinates are represented by the X and Y coordinates, for example.

Figure 3:
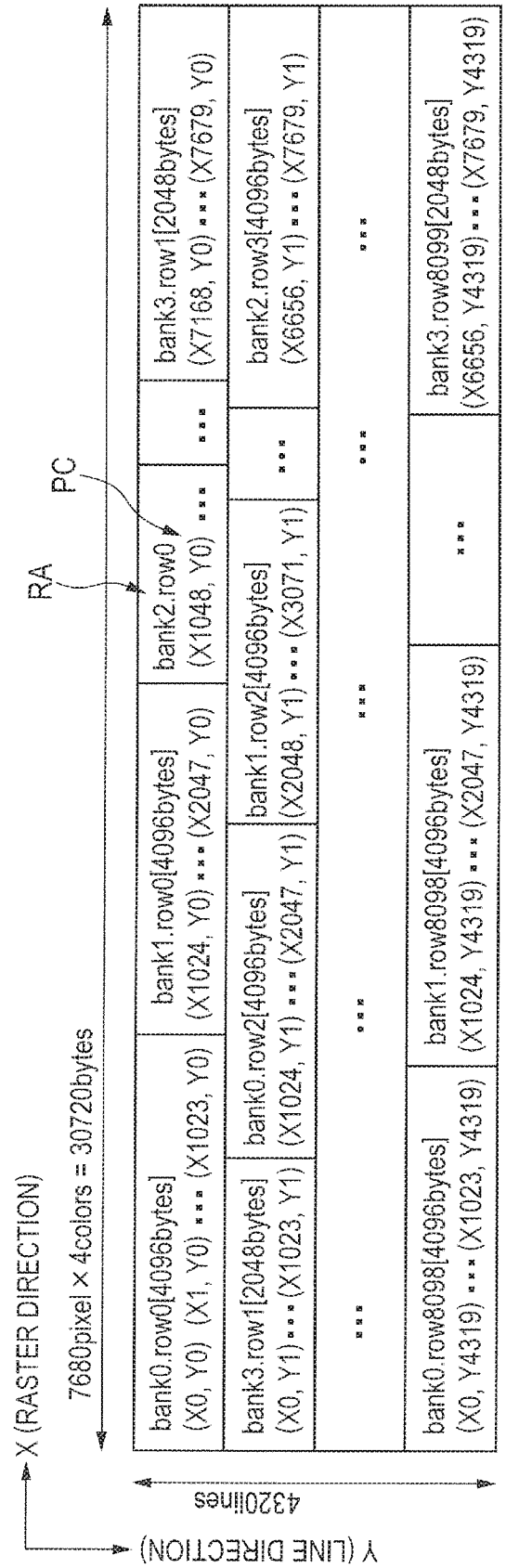
FIG. 3 is a diagram illustrating row coordinates and pixel coordinates of image data according to the embodiment 1.

The relationship between the row and pixel coordinates will be illustrated while referring to FIG. 3. FIG. 3 is a diagram illustrating row and pixel coordinates of image data according to the embodiment 1. In FIG. 3, row coordinates RA and pixel coordinates PC are arranged corresponding to the image data. That is, an arrow X in the drawing corresponds to an X direction (raster direction) of an image, and an arrow Y corresponds to a Y direction (line direction) of the image. Arbitrary pixel coordinates (Xn, Yn) of image data to be read from the memory include brightness information of ARGB (Alpha/Red/Green/blue) at corresponding pixel positions. The X coordinate is a coordinate where an X coordinate of each pixel in an image and its color information are arranged. The Y coordinate is a Y coordinate of each pixel in the image. For example, image data has 7680 pixels in the X direction and 4320 pixels in the Y direction and has color information of 7680×4=30720 bytes where each pixel has 4 bytes as the brightness information of ARGB. Further, lines of color information arranged by 30720 bytes are arranged 4320 rows in the Y direction. That is, the example illustrated in FIG. 3 has pixel coordinates from (X0, Y0) to (X7679, Y4319).

On the other hand, when the row coordinates are arranged along the raster direction from the pixel coordinates (X0, Y0) located on one end side of a line 0 and proceed to the pixel coordinates (X7679, Y0) located on the other end side of the line 0, the row coordinates are transitioned to an adjacent line. The row coordinates are arranged while incrementing the bank number in the line direction from the adjacent line. That is, the memory 110 accesses all columns while incrementing the bank number at the row coordinate of 1. After all the bank numbers for the row number of 1 are incremented at the row coordinates, the row number is incremented this time. In the present embodiment, the row coordinates corresponding to the pixel coordinates (X0, Y0) are bank0. row0. The row coordinates are arranged like bank0. row0 and bank2. row0 in the raster direction. After bank3. row0, the row number is incremented to be bank0. row1.

Further, in the present embodiment, the row of 1 records image data of 4096 bytes. Thus, for example, bank0. row0 records data of 4096 bytes from the pixel coordinates (X0, Y0) to the pixel coordinates (X1023, Y0). Further, after the image data of the pixel coordinates at the end in the raster direction is recorded, bank0. row0 is transitioned to the adjacent line to perform the recording of image data. For example, when bank3. row1 records image data of the pixel coordinates (X7679, Y0), bank3. row1 is transitioned to pixel coordinates (X0, Y1) of a line 1 to continue the recording of image data.

Referring back to FIG. 2, the description of the present embodiment will be continued. Upon outputting pixel coordinates, the pixel coordinate converting part 132b refers to the row coordinates received from the row coordinate generating part 132a, the memory configuration information received from the memory configuration information storage unit 121, and the profile information 138a of the master image included in the image information register 138. Then, the pixel coordinate converting part 132b generates pixel coordinates in the order of reading the same from the referred information and outputs the generated pixel coordinates to the command generating part 132c.

Further, the pixel coordinate converting part 132b outputs bank transition information to the row coordinate generating part 132a. The bank transition information is information output where it is necessary to collate the row coordinates received from the row coordinate generating part 132a and the profile information 138a of the master image received from the image information register 138 and increment the bank number included in the row coordinates. Specifically, for example, when all row numbers included in a bank number read at present are determined to be read at image data read at present, the pixel coordinate converting part 132b outputs bank transition information to the row coordinate generating part 132a.

When the command generating part 132c receives the pixel coordinates output from the pixel coordinate converting part 132b, the command generating part 132c generates a read command corresponding to the read pixel coordinates and outputs the same to the synthetic processing unit 133 and the command issuing part 132d. The read command includes pixel coordinates. The command generating part 132c outputs the generated read command even to the synthetic processing unit 133. Incidentally, the synthetic processing unit 133 outputs the received read command and processed synthetic image data to the write unit 134.

The command issuing part 132d receives the read command output from the command generating part 132c and receives information related to the empty capacity of the response data storage buffer 132e. The read command includes logical addresses corresponding to pixel coordinates. Upon receipt of these information, the command issuing part 132d appropriately outputs a read command to the memory controller 120.

The response data storage buffer 132e receives image data from the memory controller 120 and outputs the received image data to the synthetic processing unit 133. Further, the response data storage buffer 132e outputs the information about its internal empty capacity to the command issuing part 132d.

Incidentally, the read processing executed by the read unit 132 is dividedly performed for each data of a preset amount without processing one sheet of image data at a time. For example, the data of the preset amount is image data of one row. In that case, the row coordinates output from the row coordinate generating part 132a are temporarily ended by one row. Then, the pixel coordinate converting part 132b outputs pixel coordinates corresponding to the row coordinates for one row. Thus, when the processing is executed for each data of, for example, one row as the data of the preset amount, the row coordinate generating part 132a receives information about a data amount of one row from the memory configuration information storage unit 121 and finishes the generation and output of the row coordinates according to the received information. That is, in this case, the row coordinate generating part 132a determines the row coordinates according to the memory configuration information, the operation situation of the second image processing section, and the read start logical address.

Figure 4:
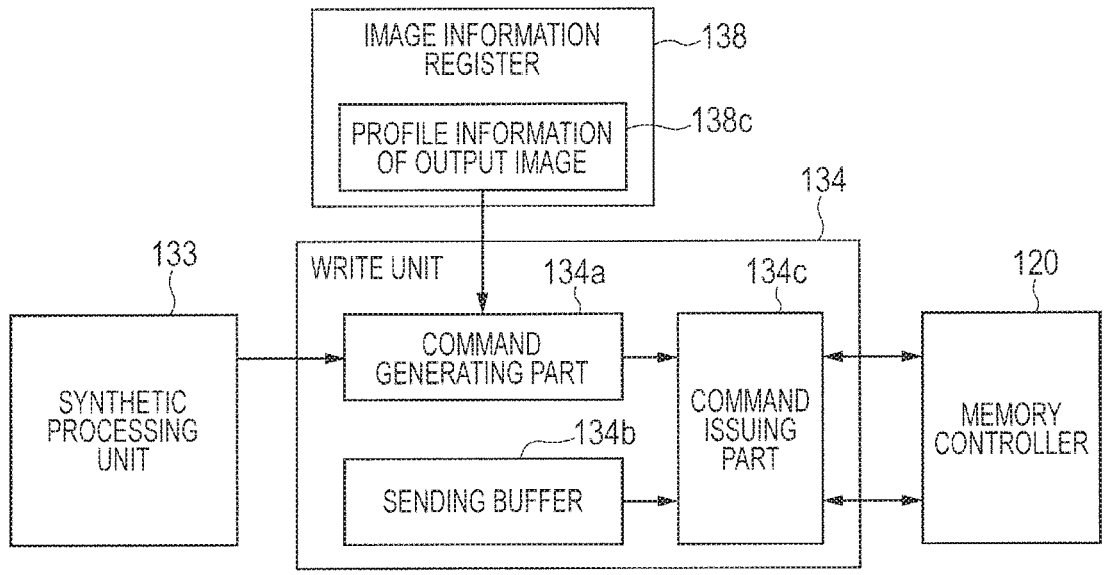
FIG. 4 is a block diagram for describing the function of a write unit 134.

Next, the details of the write unit 134 will be described while referring to FIG. 4. FIG. 4 is a block diagram for describing the function of the write unit 134. The write unit 134 is connected to the synthetic processing unit 133, the image information register 138, and the memory controller 120.

Further, the write unit 134 has a command generating part 134a, a sending buffer 134b, and a command issuing part 134c.

The command generating part 134a receives the synthetic image data output from the synthetic processing unit 133 and receives pixel coordinates corresponding to such synthetic image data. When the command generating part 134a receives these information therein, the command generating part 134a generates a write command for writing image data of a synthetic image into the memory 110 according to profile information 138c of an output image and outputs the generated write command to the command issuing part 134c. The write command includes the image data of the synthetic image and the pixel coordinates corresponding to the image data. The command generating part 134a collates the information received from the synthetic processing unit 133 and the profile information 138c of the output image with each other and determines whether synthetic image data corresponding to all pixels in the synthetic image is processed.

The sending buffer 134b receives the synthetic image from the synthetic processing unit 133 and performs buffering on it, and outputs the image data of the synthetic image and information about the remaining number of pixels to the command issuing part 134c.

The command issuing part 134c receives the write command generated by the command generating part 134a and receives the image data of the synthetic image and the remaining number of pixels output from the sending buffer 134b. Then, the command issuing part 134c outputs both the write command and the image data of the synthetic image to the memory controller 120.

Referring back to FIG. 1, the description of the present embodiment will be continued. The synthetic processing unit 133 mainly has a function of receiving a plurality of image data read by the read unit 132 and synthesizing the received image data to generate a synthetic image. The synthetic processing unit 133 is connected to the read unit 132, the write unit 134, and the register unit 131. The synthetic processing unit 133 receives the plural image data read by the read unit 132. In the present embodiment, the plural image data are for example, image data of a master image being map data, and a slave image of an icon or the like synthesized with the master image. The synthetic processing unit 133 performs processing while referring to the information of the register unit 131 and determining how to synthesize a plurality of images. Since a method of synthesizing the plural images is a related art, its description will be omitted here. The synthetic processing unit 133 outputs pixel coordinates corresponding to the generated synthetic image data and the synthetic image to the write unit 134.

The start-up managing unit 135 manages the start-up of the read unit 132 and the write unit 134. Upon starting up the read unit 132 and the write unit 134, the start-up managing unit 135 detects from the register unit 131, a start-up register value which becomes a start-up trigger for each of the read unit 132 and the write unit 134. The start-up managing unit 135 instructs the read unit 132 and the write unit 134 to start up according to the detected start-up register value.

The second image processing section 140 has a function and configuration similar to those of the first image processing section 130. Specifically, the second image processing section 140 has a register unit 141, a read unit 142, a synthetic processing unit 143, a write unit 144, and a start-up managing unit 145. The functions of the respective configurations are similar to those of their corresponding configurations of the first image processing section 130.

The CPU 160 is a central processing unit of the semiconductor device 100. The CPU 160 determines a read start logical address being a logical address to start reading where one of a plurality of read units reads image data.

Also, the CPU 160 reads profile information of image data through the memory controller 120. The CPU 160 writes the read profile information of image data into the register unit 131 included in the first image processing section 130. Likewise, the CPU 160 writes the read profile information of image data into the register unit 141 included in the second image processing section 140.

Further, the CPU 160 determines an access start bank number when the first image processing section 130 reads image data and writes the determined access start bank number into the access method register 136 of the register unit 131. Upon determining the access start bank number of the first image processing section 130, the CPU 160 refers to an in-access bank number recorded in an access method register 146 included in the register unit 141 of the second image processing section 140.

The CPU 160 determines the access start bank number in such a manner that the first image processing section 130 and the second image processing section 140 do not cause bank conflict. That is, the CPU 160 determines a bank number different from a bank number accessed by the second image processing section as the access start bank number of the first image processing section 130. Likewise, the CPU 160 determines an access start bank number when reading image data by the second image processing section 140, and writes the determined access start bank number into the access method register 146 of the register unit 141. The CPU 160 writes such an access start bank number into the access method register 146 to thereby instruct an access method to the first image processing section 130. It can be said that the CPU 160 includes the function of managing the access method as described above.

Figure 5:
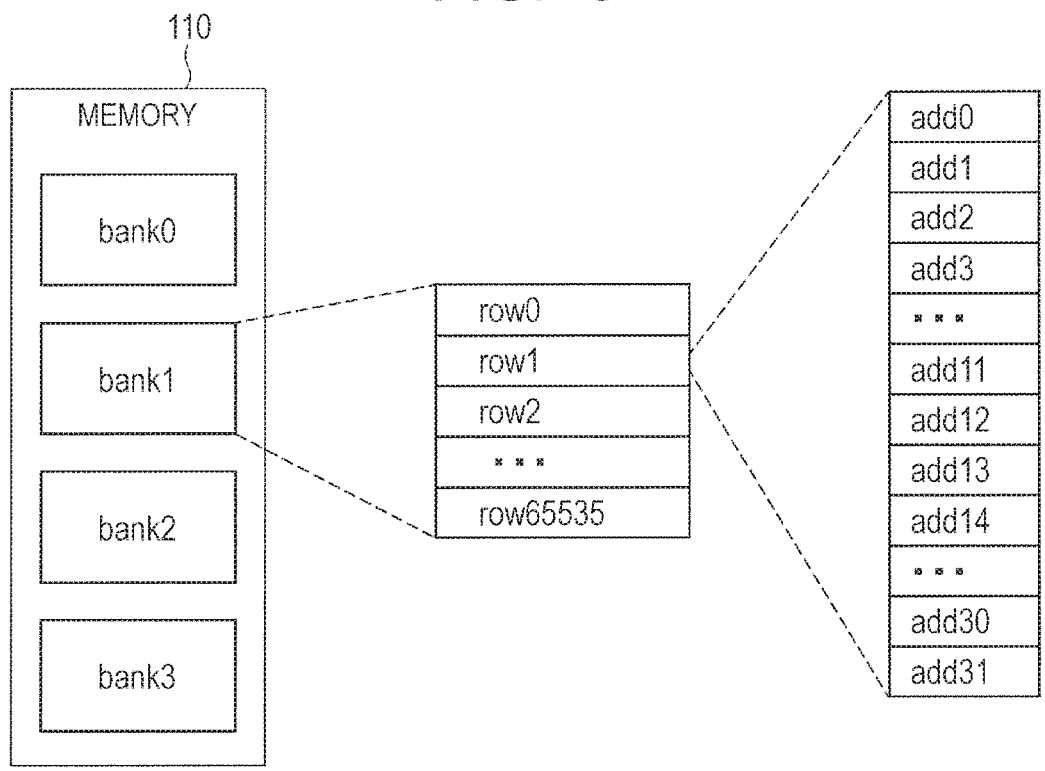
FIG. 5 is a typical diagram for describing an address space of a memory 110.

The address space of the memory 110 illustrated in FIG. 1 will next be described while referring to FIG. 5. FIG. 5 is a typical diagram for describing the address space of the memory 110. The memory 110 is a memory unit such as a DRAM (Dynamic Random Access Memory) or the like. In the present embodiment, the memory 110 has four banks (banks0 through bank3). Further, one bank has row addresses of 16 bits (row0 through row65535). Besides, logical addresses corresponding to one row address are configured as 32 bits, for example. Such logical addresses include the above-described 16-bit row addresses, bank addresses of 2 bits, and byte addresses of 14 bits. Incidentally, these addresses are only illustrated by way of example, and the assignment in the address space may be changed by their settings.

In the example disclosed in the present embodiment, arbitrary master image data are respectively set to the memory 110 so as to be recorded from the bank0 and the row0. Further, when reading the image data of the master or slave image from the memory 110 in the semiconductor device 100, the initial value of the read start logical address is set to the bank0 and the row0. Incidentally, the physical address and read start logical address in the memory may not take the above-described contents so long as they are associated and managed by the CPU 160.

Figure 6:
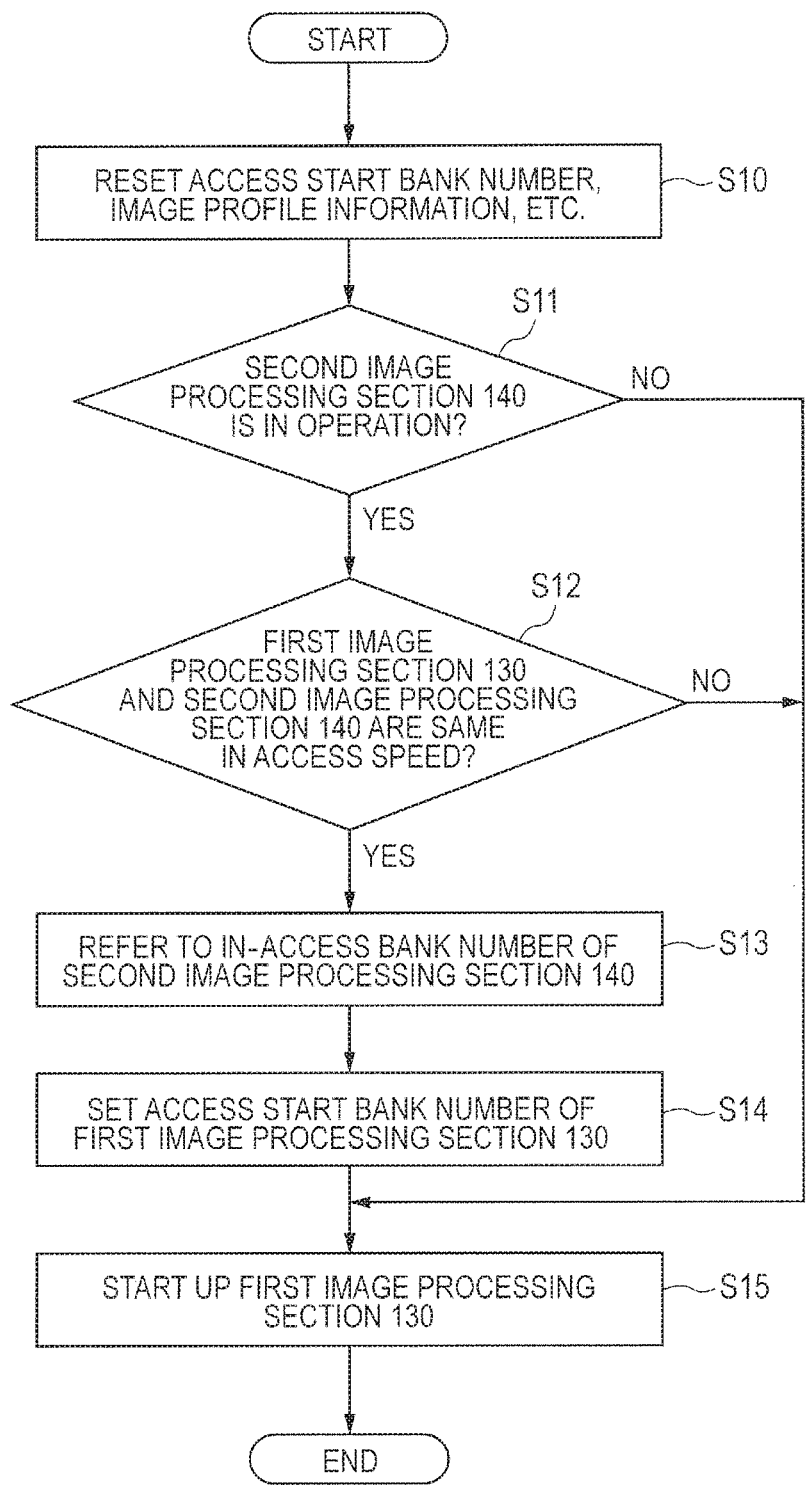
FIG. 6 is a flowchart for describing image data read processing according to the embodiment 1.

Next, processing executed by the CPU 160 will be described while referring to FIG. 6. FIG. 6 is a flowchart for describing image data read processing according to the embodiment. FIG. 6 shows processing where the CPU 160 instructs the first image processing section 130 to read image data.

First, the CPU 160 resets an access start bank number, image profile information and the like for inputting to the first image processing section 130 (Step S10).

Next, the CPU 160 determines whether the second image processing section 140 is in operation (Step S11). Specifically, the CPU 160 reads an operation register of the second image processing section 140 and determines from a read value that the second image processing section 140 is in operation.

When the second image processing section 140 is not in operation, the CPU 160 does not determine that the second image processing section 140 is in operation (Step S11: No). In this case, since only the first image processing section 130 accesses the memory 110, no bank conflict occurs. Thus, the CPU 160 performs processing for starting up the first image processing section 130, based on the preset initial values (Step S15). As the initial values in this case, for example, the access start bank number is the bank0. Further, for example, the row number to start access is the row0.

When the second image processing section 140 is in operation, the CPU 160 determines that the second image processing section 140 is in operation (Step S11: Yes). In this case, since the first image processing section 130 and the second image processing section 140 access the memory 110, there is a possibility that the bank conflict will occur.

When it is determined that the second image processing section 140 is in operation (Step S11: Yes), the CPU 160 determines whether the first image processing section 130 and the second image processing section 140 are the same in access speed (Step S12).

When the first image processing section 130 and the second image processing section 140 are different in access speed, the CPU 160 does not determine that the first image processing section 130 and the second image processing section 140 are the same in access speed (Step S12: No). In this case, the CPU 160 does not set the access start bank number of the first image processing section 130. Thus, the CPU 160 performs processing for staring up the first image processing section 130, based on the above-described initial values (Step S15).

On the other hand, when the first image processing section 130 and the second image processing section 140 are the same in access speed, the CPU 160 determines that the first image processing section 130 and the second image processing section 140 are the same in access speed (Step S12: Yes). In this case, when the bank to be accessed by the first image processing section 130 and the bank to be accessed by the second image processing section 140 become the same, bank conflict occurs. Thus, the CPU 160 refers to the in-access bank number of the second image processing section 140 (Step S13). More specifically, the CPU 160 reads the in-access bank number included in the register unit 141 of the second image processing section 140.

Next, the CPU 160 sets the in-access bank number of the first image processing section 130 (Step S14). Specifically, the CPU 160 refers to the in-access bank number read in Step S13, of the second image processing section 140 and determines a bank number which does not conflict with the in-access bank number. For example, when the in-access bank number of the second image processing section 140 is the bank0, the CPU 160 sets the access start bank number of the first image processing section 130 to other than the bank0. The access start bank number of the first image processing section 130 may be determined based on the following equation (1), for example:

$$BA=(BN+BT/2)\%BT \quad (1)$$

where BA is the access start bank number of the first image processing section 130. BN is the in-access bank number of the second image processing section 140. BT is the number of banks. In this case, assuming that for example, BN=3 and BT=4, BA=1.

Next, the CPU 160 starts up the first image processing section 130 (Step S15). In this case, the CPU 160 writes the value set in Step S14 into the in-access bank number of the register unit 131 after having started up the first image processing section 130.

Incidentally, although FIG. 6 has shown the processing where the CPU 160 instructs the first image processing section 130 to read the image data, the processing taken where the CPU 160 instructs the second image processing section 140 to read image data is also executed in a manner similar to the above-described processing.

Next, the transition of physical addresses when the first image processing section 130 and the second image processing section 140 read image data of the memory 110 will be described while referring to FIGS. 7 and 8.

Figure 7:
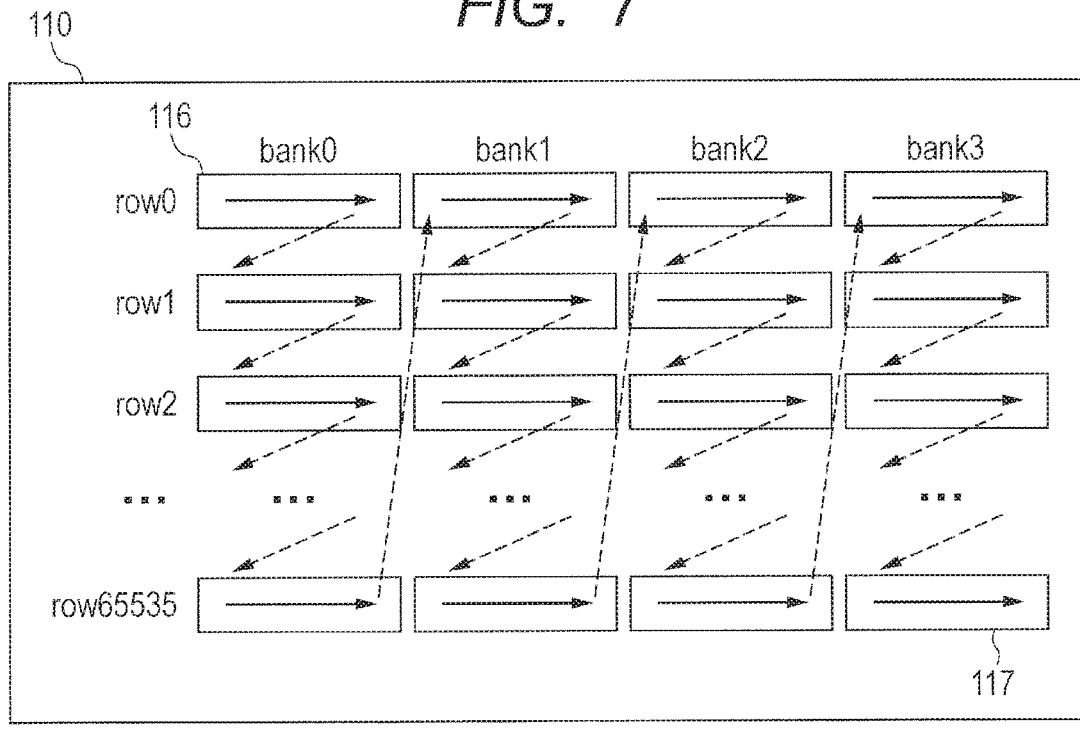
FIG. 7 is a typical diagram showing the transition of physical addresses read by a second image processing section 140.
Figure 8:
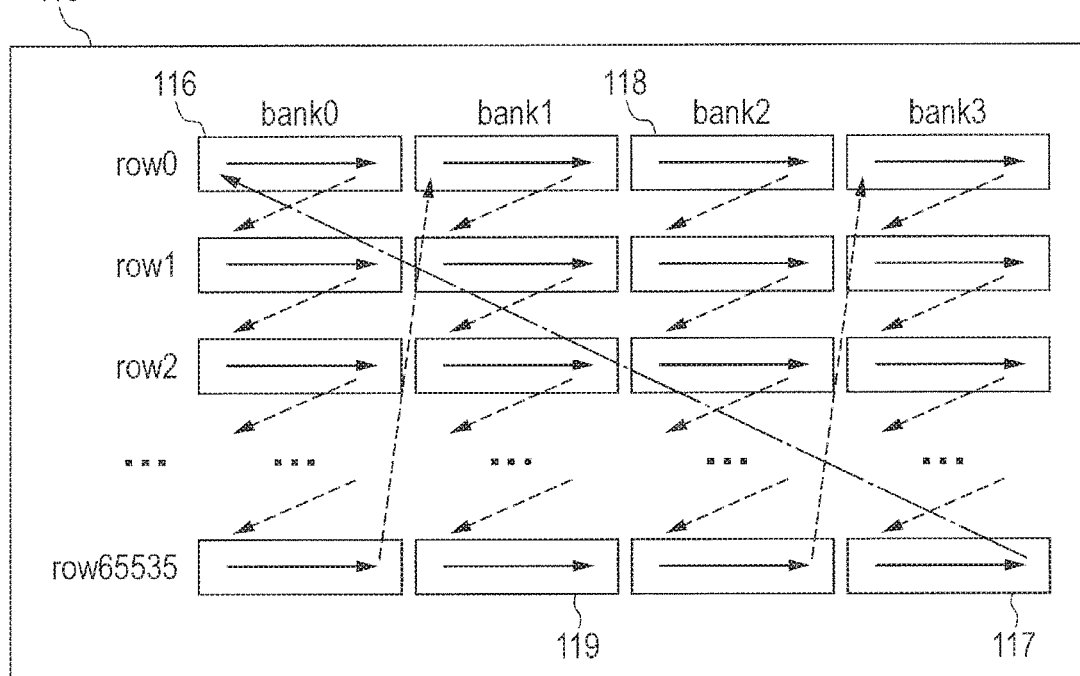
FIG. 8 is a typical diagram showing the transition of physical addresses read by a first image processing section 130.

FIG. 7 is a typical diagram showing the transition of the physical addresses read by the second image processing section 140. FIG. 7 typically shows the physical addresses in the memory 110. In FIG. 7, memories corresponding to one row, each storing image data therein are shown in a rectangular form. The same bank numbers are arranged vertically, and the same row numbers are arranged horizontally. The memory 110 has four bank numbers (bank0 through bank3). Thus, the rectangular memories are horizontally arranged in four rows. Further, the memory 110 has 65536 row numbers (row0 through row65535). Thus, the rectangular-shaped memories corresponding to one row are vertically arranged in 65536 rows. Incidentally, the bank numbers and the row numbers shown here are numbers assigned for convenience sake for description.

In the example shown in FIG. 7, the second image processing section 140 reads image data for each bank number. That is, when a read start logical address is instructed, the read unit 142 of the second image processing section 140 reads image data stored in a bank number corresponding to the read start logical address. Then, the read unit 142 sequentially performs the operation of reading image data stored in the next bank number. Specifically, the read unit 142 starts reading of image data, based on preset initial values. The preset initial values are, for example, a bank0 and a row0. Then, the read unit 142 sequentially reads image data stored in all rows at the bank0. Thus, the second image processing section 140 reads image data for each bank number. Therefore, the order of row coordinates of the image data read by the second image processing section 140, and the order of the row coordinates in the raster direction, of the image data described while referring to FIG. 3 are different.

When the image data of the bank0 are all read, the read unit 142 increments the bank number and reads image data of the bank1. The read unit 142 sequentially performs such processing to read all image data of the bank3. The read unit sequentially reads image data with respect to all the banks and completes its processing. In FIG. 7, arrows indicated by solid lines show the read processing of the read unit 142 at each memory. Further, arrows indicate by broken lines show flows when the read processing is transitioned. In FIG. 7, the memory in which the read unit 142 starts reading is a memory 116. Further, the memory in which the read unit 142 performs reading lastly is a memory 117.

Next, the transition of physical addresses read by the first image processing section 130 will be described while referring to FIG. 8. FIG. 8 is a typical diagram showing the transition of each physical address read by the first image processing section 130. The typical diagram illustrated in FIG. 8 shows the same memory configuration as that described in FIG. 7. The first image processing section 130 reads image data every bank number as with the second image processing section. In the first image processing section 130, however, the access start bank number is instructed by the CPU 160.

The CPU 160 reads, for example, the in-access bank number of the second image processing section 140 as the bank0. In this case, the CPU 160 sets the in-access bank number of the first image processing section 130 to be the bank2, for example. The read unit 132 of the first image processing section 130 reads the access start bank number stored in the access method register 136 of the register unit 131 and starts reading of image data from the bank2.

Incidentally, in the present embodiment, the row number to start reading is the same row0 as a row number being an initial value. That is, the first image processing section 130 starts reading of image data from a memory 118 at the bank2 and row0.

When the image data of the bank2 are all read, the first image processing section 130 increments a bank number and reads image data of a bank3. Then, when image data of a memory 117 is completely read, the first image processing section 130 starts reading of image data of a memory 116 at the bank0 and row0. In FIG. 8, a transition from the memory 117 to the memory 116 is indicated by a dashed line arrow. The first image processing section 130 sequentially reads image data every bank number in this way and performs reading up to a memory 119 at a bank1 and a row65535.

Figure 9:
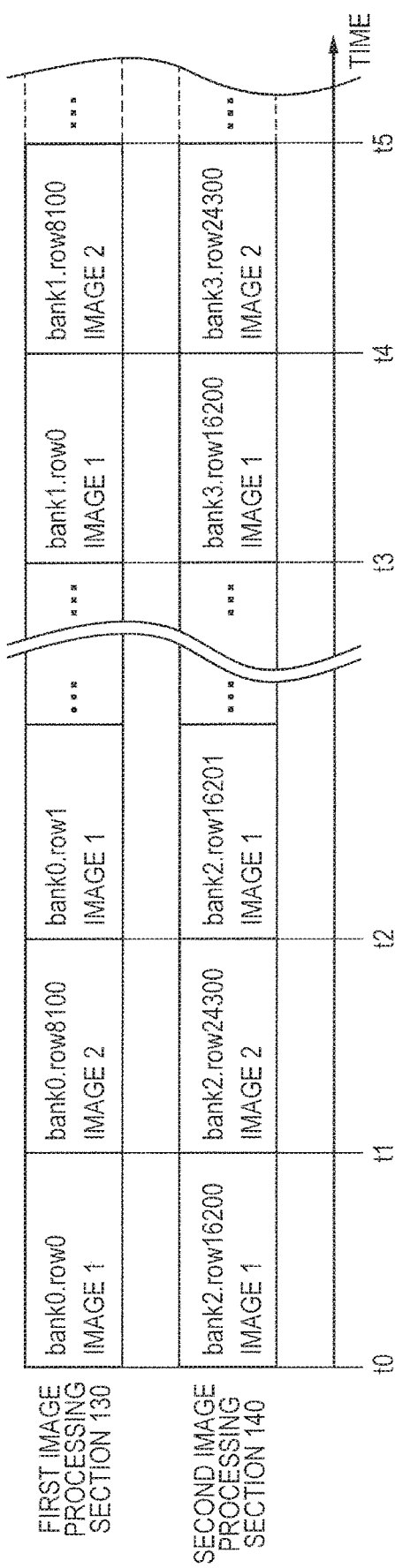
FIG. 9 is a diagram for describing access states of the first image processing section 130 and the second image processing section 140.

Next, the access states of the first and second image processing sections 130 and 140 will be described while referring to FIG. 9. FIG. 9 is a diagram for describing the access states of the first image processing section 130 and the second image processing section 140. In FIG. 9, the horizontal axis indicates the time. That is, FIG. 9 illustrates to which physical address each of the first image processing section 130 and the second image processing section 140 makes access.

At times t0 to t1, the first image processing section 130 accesses image data of an image 1 at a memory of a bank0 and a row0. On the other hand, the second image processing section 140 accesses image data of an image 1 at a memory of a bank2 and a row16200. At the times t1 to t2, the first image processing section 130 accesses image data of an image 2 at a memory of a bank0 and a row8100. On the other hand, the second image processing section 140 accesses image data of an image 2 at a memory of a bank2 and a row24300.

Thus, the first image processing section 130 and the second image processing section 140 respectively access image data of different bank numbers according to the same processing sped. Further, the first image processing section 130 and the second image processing section 140 alternately access the image data of the image 1 and the image data of the image 2 and read their image data. In this case, for example, pixel coordinates of the image data of the image 1 read by the first image processing section 130 at the times t0 to t1, and pixel coordinates of the image data of the image 2 read by the first image processing section 130 at the times t1 to t2 correspond to each other. By reading the image data in this manner, the semiconductor device 100 is capable of sequentially reading the image data corresponding to the master and slave images respectively. The first image processing section 130 reads the image data of the images 1 and 2 stored in the bank0 at the times t0 to t3. Then, after the time t3, the first image processing section 130 increments the bank number and sequentially reads image data of a bank0. At the same time, the second image processing section 140 reads image data of images 1 and 2 stored in a bank2 at the times t0 to t3. Then, after the time t3, the second image processing section 140 increments the bank number and sequentially reads image data of a bank3. Thus, in the semiconductor device 100, the first image processing section 130 and the second image processing section 140 respectively read a plurality of image data while avoiding bank conflict.

With the configuration describe above, the embodiment 1 is capable of providing a semiconductor device which suppresses a delay in processing.

Incidentally, although the synthetic processing of the image data has been described by way of example, the processing is not limited to this example. When such processing that a plurality of processing systems read data stored across a plurality of banks is adopted, a similar effect can be obtained. A similar effect can be obtained even in the case of, for example, noise removing processing for removing noise from an image, processing for image interlace-to-progressive conversion, etc. Further, the data to be read is not limited to the image data either. When data stored across a plurality of banks and in which no limitation is imposed onto the order of each bank to be read are adopted, a similar effect can be obtained. These are similar even as in the case of other embodiments and their modifications to be described subsequently.

Modification of Embodiment 1

Figure 10:
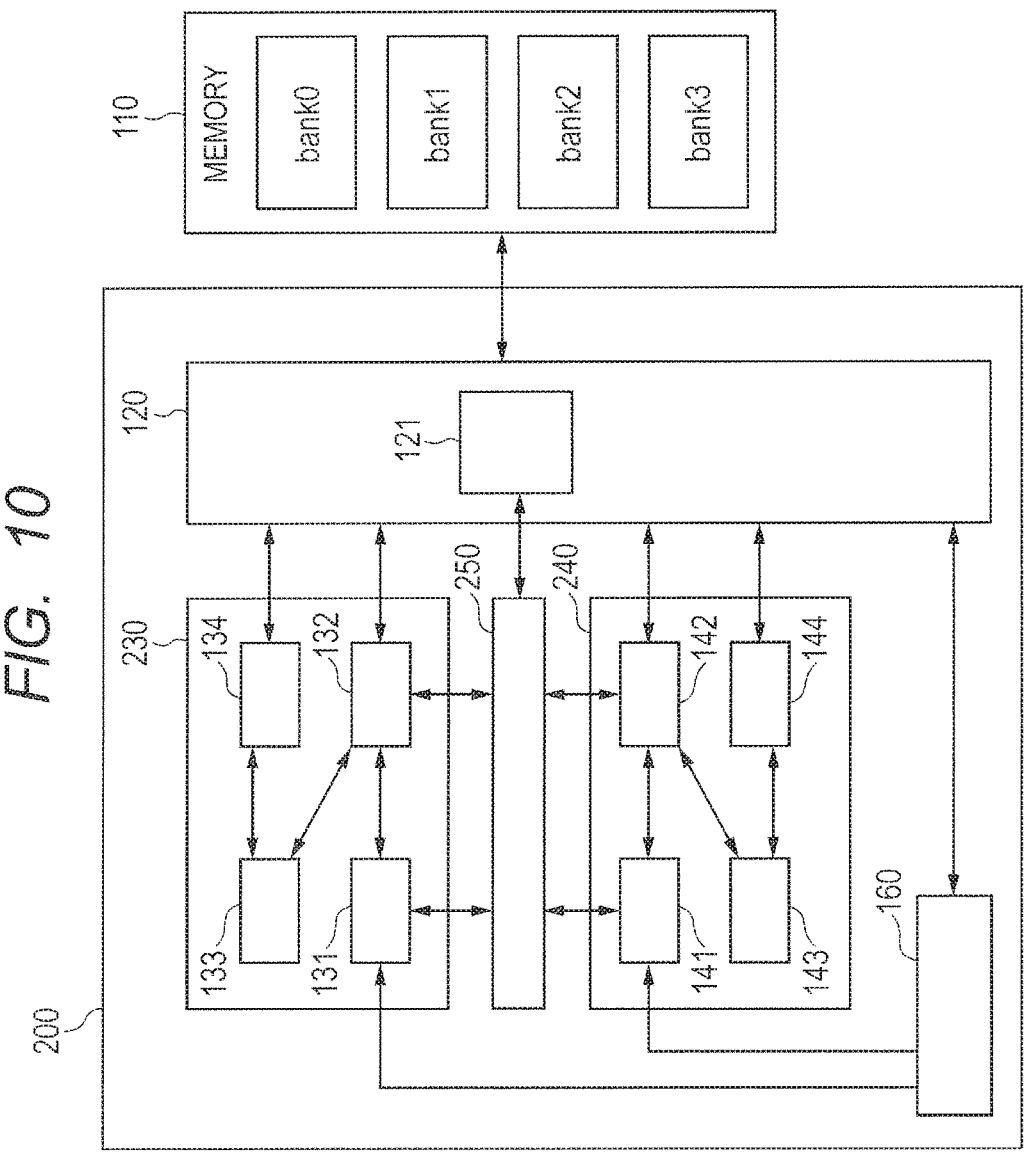
FIG. 10 is a block diagram of a semiconductor device according to a modification of the embodiment 1.

A modification of the embodiment 1 will next be described while referring to FIG. 10. FIG. 10 is a block diagram of a semiconductor device according to the modification of the embodiment 1. The semiconductor device 200 according to the modification of the embodiment 1, which is shown in FIG. 10 is different from the semiconductor device 100 according to the embodiment shown in FIG. 1 in terms of a configuration of instructing an access method.

The semiconductor device 200 has a memory controller 120, a first image processing section 230, a second image processing section 240, an access method instructing section 250, and a CPU 160 as a main configuration.

The first image processing section 230 has a register unit 131, a read unit 132, a synthetic processing unit 133, and a write unit 134. The first image processing section 230 is connected to the access method instructing section 250 instead of the start-up managing unit 135. The second image processing section 240 has a register unit 141, a read unit 142, a synthetic processing unit 143, and a write unit 144. The second image processing section 240 is connected to the access method instructing section 250 instead of the start-up managing unit 145.

The access method instructing section 250 instructs the first image processing section 230 and the second image processing section 240 about an access method for a memory 110 to avoid the occurrence of bank conflict. Specifically, the access method instructing section 250 is connected to a memory configuration information storage unit 121 included in the memory controller 120 to read memory configuration information. Further, the access method instructing section 250 is connected to the register unit 131 included in the first image processing section 230 to read profile information of image data processed by the first image processing section 230. Likewise, the access method instructing section 250 is connected to the register unit 141 included in the second image processing section 240 to read profile information of image data processed by the second image processing section 240.

Also, the access method instructing section 250 monitors operation situations of the first image processing section 230 and the second image processing section 240. That is, the access method instructing section 250 monitors whether the first image processing section 230 and the second image processing section 240 are in operation, and monitors bank numbers at which they are in access.

Further, the access method instructing section 250 determines read start logical addresses with respect to the first image processing section 230 and the second image processing section 240 and outputs the determined read start logical addresses to them.

That is, the access method instructing section 250 has a function of managing an access method for each of the read units 132 and 142. That is, the access method instructing section 250 determines a read start bank number according to the memory configuration information and the operation situation of each read unit and instructs each read unit about the determined read start bank number.

With the adoption of such a configuration, the modification of the embodiment 1 is capable of providing a semiconductor device which suppresses a delay in processing.

Incidentally, the modification of the embodiment 1 is not limited to the above. For example, the semiconductor device according to the embodiment 1 may have three or more image processing sections. Also, the semiconductor device according to the embodiment 1 may have one access method instructing section. Further, each image processing section may have a start-up managing unit. In this case, the access method instructing section is connected to, for example, a plurality of image processing sections to monitor operation situations of the respective image processing sections and outputs a read start bank number to each image processing section to avoid access conflict therebetween.

Embodiment 2

Figure 11:
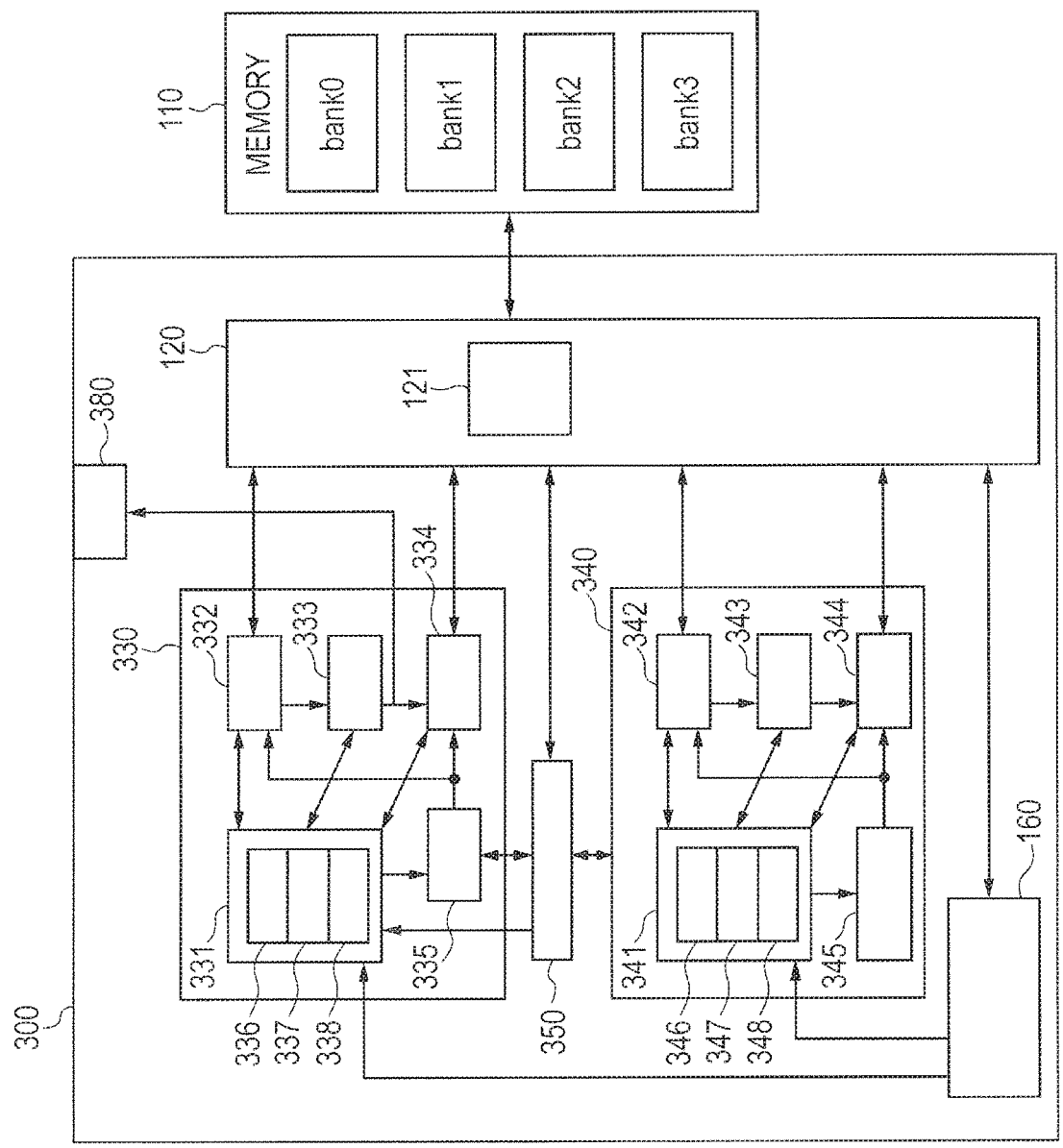
FIG. 11 is a block diagram of a semiconductor device according to an embodiment 2.

An embodiment 2 will next be described while referring to FIG. 11. FIG. 11 is a block diagram of a semiconductor device according to the embodiment 2. The semiconductor device 300 according to the embodiment 2 shown in FIG. 11 is different from the semiconductor device according to the modification of the embodiment 1 shown in FIG. 10 in that it has a display interface. Further, the semiconductor device 300 includes a first image processing section 330 having a start-up managing unit 335, and a second image processing section 340 having a start-up managing unit 345.

The semiconductor device 300 has a memory controller 120, a CPU 160, a first image processing section 330, a second image processing section 340, an access method instructing section 350, and a display interface unit 380 as a main configuration.

The first image processing section 330 is different from the first image processing section according to the embodiment 1 in that the first image processing section 330 is connected to the display interface unit 380. The first image processing section 330 has a function of outputting a synthetic image subjected to synthetic processing to the display interface unit 380 in addition to a function of writing it into a memory 110. That is, the first image processing section 330 at least has a switch (not shown) for selecting a destination to output the synthetic image. Thus, the first image processing section 330 selects whether to output the synthetic image to the display interface unit 380 or a write unit 334.

Further, the first image processing section 330 has a start-up managing unit 335. The start-up managing unit 335 manages the start-up of a read unit 332 and the write unit 334. Upon starting up the read unit 332 and the write unit 334, the start-up managing unit 335 reads from a register unit 331, a start-up register value which becomes a start-up trigger for each of the read unit 332 and the write unit 334. The start-up managing unit 335 instructs the read unit 332 and the write unit 334 to start up according to the read start-up register value.

The access method instructing section 350 reads a prescribed register included in the first image processing section 330 and thereby detects a destination to output a synthetic image. The access method instructing section 350 determines an access method for the read unit 332 according to the detected output destination.

The access method instructing section 350 is capable of determining two access methods, for example. The first access method is the method described in the embodiment 1. That is, the first access method sequentially performs the operations of reading image data of a bank number included in a read-starting logical address and reading image data of the next bank number after the reading of the image data of the bank number is finished. Further, the second access method sequentially performs the operation of reading image data from a read-starting logical address along a raster direction. That is, as described in FIG. 3, the second access method of reading the image data along the raster direction increments the bank number when the image data corresponding to one row is read. Then, when image data of all bank numbers of a prescribed row number are read, the second access method increments the row number. The access method instructing section 350 instructs the read unit about either one of these access methods.

Specifically, when the output destination for the synthetic image is intended for the write unit 334, the access method instructing section 350 instructs the read unit 332 to access the memory 110 according to the first access method. That is, the access method instructing section 350 determines a read start bank number in accordance with memory configuration information received from a memory configuration information storage unit 121 and an operation situation of the second image processing section 340. Then, the access method instructing section 350 instructs the read unit 332 about the determined read start bank number.

On the other hand, when the output destination for the synthetic image is intended for the display interface unit 380, the access method instructing section 350 does not instruct the first access method to the read unit 332. With the non-instruction of the first access method by the access method instructing section 350, the read unit 332 reads image data according to the order corresponding to a display method of a display unit connected to the display interface unit 380. The order corresponding to the display method of the display unit is an access to be carried out in accordance with the order of arrangement of image's raster data, for example. That is, the read unit 332 performs access by the second access method.

Thus, the semiconductor device 300 has the display interface unit 380 for outputting the image data to the display unit, and the write unit 334 for writing the image data into the memory 110. Then, the access method instructing section 350 selects the access method according to whether the output destination for the image data read by the read unit 332 is intended for either the display interface unit 380 or the write unit 334.

An example having a configuration of selecting the output destination for the synthetic image will be described below. First, the CPU 160 records the output destination for the synthetic image into the prescribed register included in the first image processing section 330. Upon starting up the first image processing section 330, the start-up managing unit 335 detects the output destination for the synthetic image from the value of the prescribed register. When the output destination for the synthetic image is intended for the display interface unit 380, the start-up managing unit 335 outputs a prescribed request signal to the access method instructing section 350. In receipt of the prescribed request signal from the start-up managing unit 335, the access method instructing section 350 stops the instruction of the access start bank number to the read unit 332 correspondingly.

Another example having a configuration of selecting the output destination for the synthetic image will be described below.

First, the CPU 160 records the output destination for the synthetic image into the prescribed register included in the first image processing section 330. The access method instructing section 350 reads the prescribed register included in the first image processing section 330 to detect the output destination for the synthetic image. The access method instructing section 350 determines according to the detected output destination whether to instruct the read unit 332 about the first access method.

The above-described function of access method instructing section 350 can also be described in the following manner. When the output destination for the image data read by the read unit 332 is intended for the write unit 334, the access method instructing section 350 determines the first access method. Further, when the output destination for the image data read by the read unit 332 is intended for the display interface unit 380, the access method instructing section 350 determines the second access method.

On the other hand, when the access method instructing section 350 instructs an access method to the read unit 342 of the second image processing section 340, the access method instructing section 350 refers to the access method being executed by the read unit 332 of the first image processing section. Then, the access method instructing section 350 determines the access method of the read unit 342 according to the access method being carried out by the read unit 332.

When the output destination for the synthetic image data generated by the first image processing section 330 is intended for the write unit 334, the semiconductor device 300 according to the embodiment 2 performs read processing according to the first access method as with the embodiment 1. Therefore, in this case, the semiconductor device 300 avoids bank conflict at the time of reading the image data.

When the output destination for the synthetic image data generated by the first image processing section 330 is intended for the display interface unit 380, the semiconductor device 300 according to the embodiment 2 is different from the semiconductor device according to the embodiment 1 in terms of the configuration described in the embodiment 1. In this case, the first image processing section 330 performs read processing by the second access method for accessing image data in accordance with the order of arrangement of raster data of each image. On the other hand, the second image processing section 340 performs read processing by the first access method reading image data stored in the bank number included in the read start logical address.

Thus, when the first image processing section 330 performs the processing based on the second access method, and the second image processing section 340 performs the processing based on the first access method, the access performed to the memory 110 by the first image processing section 330 and the access performed to the memory 110 by the second image processing section 340 conflict with each other with a constant probability. Specifically, when the logical addresses of the memory 110 include four banks, there is a possibility that the bank conflict will occur with a probability of ¼, i.e., 25%. In this case, however, the probability that the bank conflict will occur can be predicted. Therefore, it is possible to suppress a delay in processing speed within a predicted range of bank conflict.

Further, the access method set for each bank to be accessed by the second image processing section 340 in this case is close to the line direction of the image data. Therefore, the above access method and the access method along the raster direction, which is performed by the first image processing section 330 have a relation close to orthogonality. Thus, even when the bank conflict occurs, the bank conflict can be solved in a short period of time.

According to the embodiment 2 as described above, it is possible to provide a semiconductor device which suppresses a delay in processing.

Embodiment 3

Figure 12:
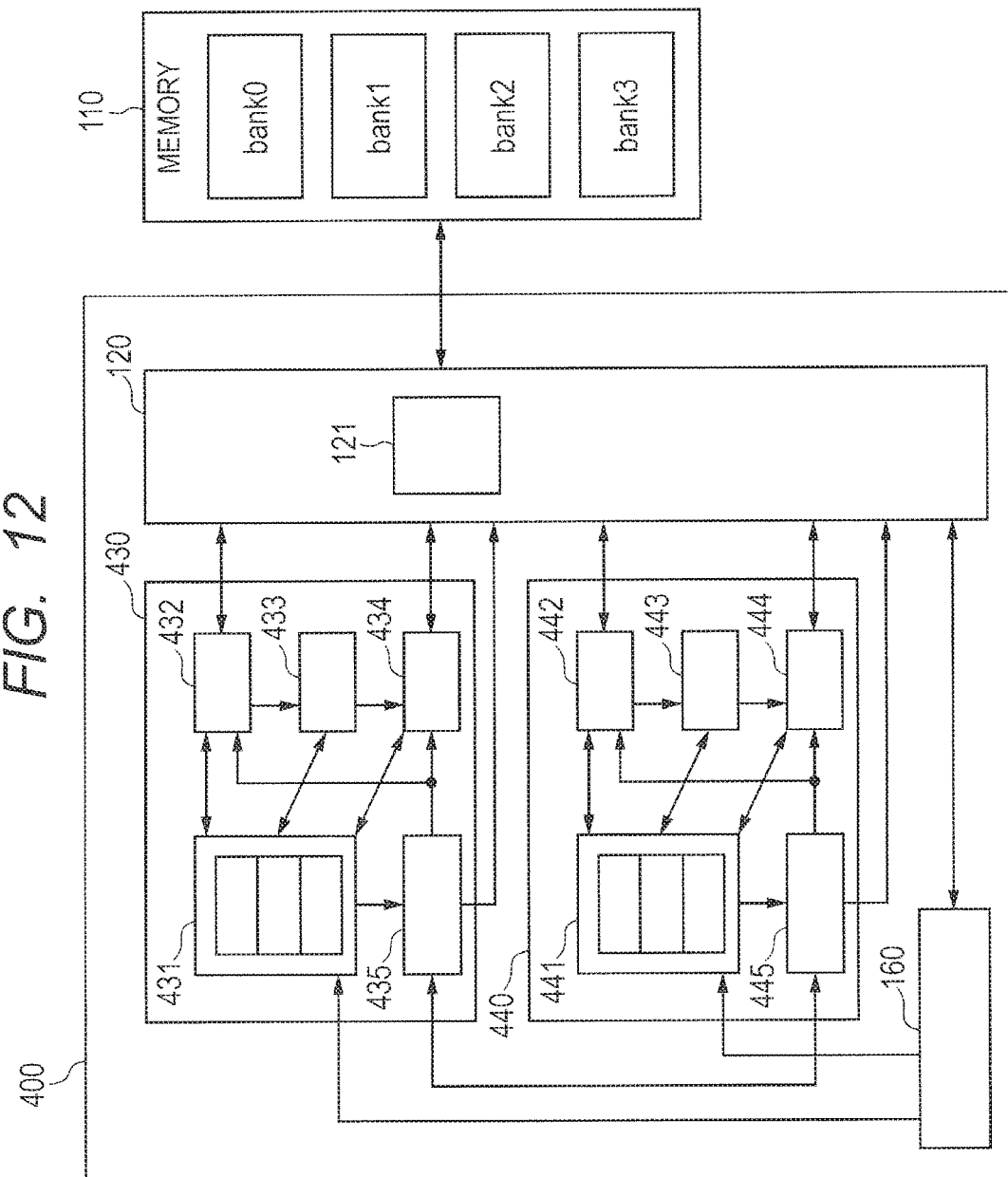
FIG. 12 is a block diagram of a semiconductor device according to an embodiment 3.

An embodiment 3 will next be described while referring to FIG. 12. FIG. 12 is a block diagram of a semiconductor device according to the embodiment 3. The semiconductor device 400 according to the embodiment 3 shown in FIG. 12 is different from the semiconductor device 100 according to the embodiment 1 shown in FIG. 1 in terms of the configuration of the start-up managing unit. The semiconductor device 400 according to the embodiment 3 has a function of comparing image profiles of image data respectively read by a plurality of image processing sections. Further, the semiconductor device 400 according to the embodiment 3 is different from the semiconductor device according to the embodiment 1 in terms of an access method instructed by the start-up managing unit.

The semiconductor device 400 has a memory controller 120, a CPU 160, a first image processing section 430, and a second image processing section 440 as a main configuration.

The first image processing section 430 has a register unit 431, a read unit 432, a synthetic processing unit 433, a write unit 434, and a start-up managing unit 435. Further, the second image processing section 440 has a register unit 441, a read unit 442, a synthetic processing unit 443, a write unit 444, and a start-up managing unit 445.

The read unit 432 is different from that in the embodiment in that it does not perform the processing of sequentially generating the row coordinates and the processing of converting the row coordinates into the pixel coordinates. That is, the read unit 432 does not have the row coordinate generating part and the pixel coordinate converting part.

The start-up managing unit 435 detects information stored in the register unit 431 to instruct the read unit 432 and the write unit 434 to start up. Further, the start-up managing unit 435 detects information stored in the register unit 431 to instruct a third access method to the read unit 432. The start-up managing unit 445 also has a configuration similar to that of the start-up managing unit 435.

Further, the start-up managing unit 435 and the start-up managing unit 445 are connected to each other. The start-up managing unit 435 receives information related to a block size included in profile information of image data read from the register unit 431 by the first image processing section 430. Further, the start-up managing unit 445 receives information related to a block size included in profile information of image data read from the register unit 441 by the second image processing section 440. The block size is the size of image data read by the imager processing section at a time and includes, for example, one obtained by multiplying a row size by the number of banks, the number of bytes corresponding to 1 line of image, etc.

For example, when the first image processing section 430 starts reading of image data, the start-up managing unit 435 receives profile information of an image read by the second image processing section 440 from the start-up managing unit 445. Then, the start-up managing unit 435 compares the profile information of the image read by the second image processing section 440 with profile information of an image to be read by the first image processing section 430. As a result of the comparison, when they are different from each other in block size, and the probability that bank conflict will occur is smaller than a preset value, the start-up managing unit 435 does not instruct the read unit 432 about the third access method. Here, the non-instruction as to the third access method is to adopt an access method based on a preset initial value. The access method based on the preset initial value is to access image data along the arrangement of raster data of each image, for example. That is, in this case, the read unit 432 performs access by a second access method.

On the other hand, when the profile information of the image read by the second image processing section 440, and the profile information of the image to be read by the first image processing section 430 have a common block size, and the probability that the bank conflict will occur exceeds the preset value, the start-up managing unit 435 instructs the read unit 432 about the third access method.

Figure 13:
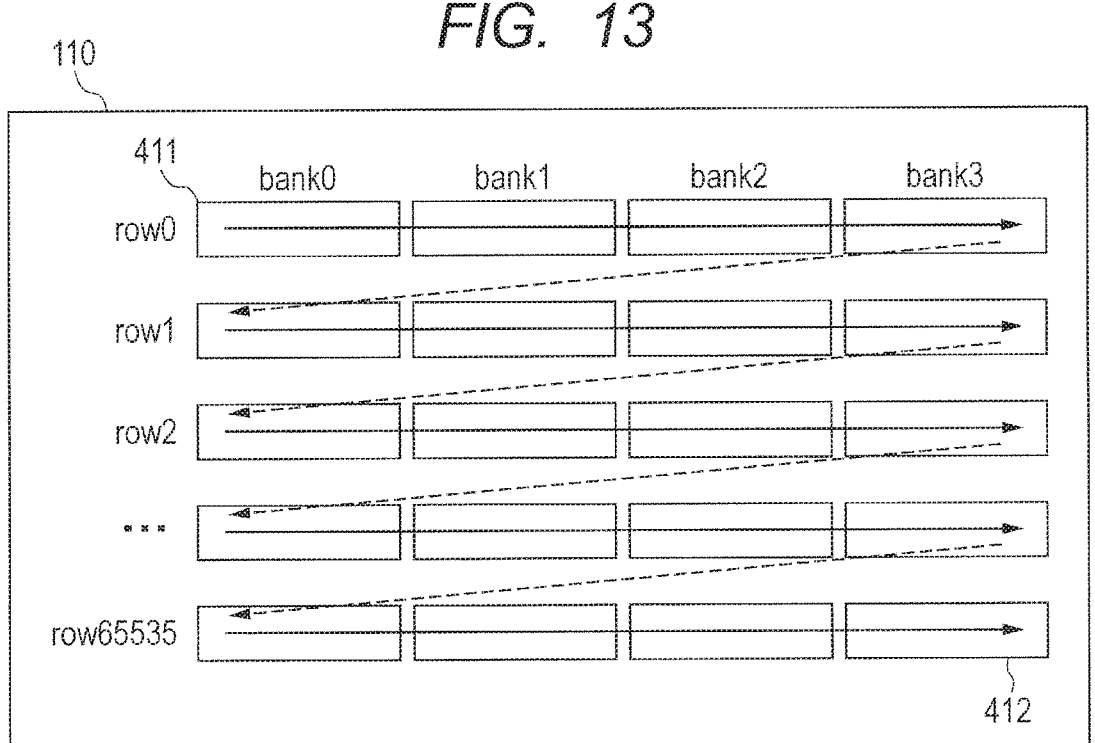
FIG. 13 is a typical diagram showing the transition of logical addresses when a second image processing section 440 reads image data by a second access method.

The third access method about which the start-up managing unit 435 instructs the read unit 432 will be described while referring to the drawings. First, FIG. 13 is a typical diagram showing the transition of logical addresses when the second image processing section 440 reads image data by the second access method. As described above, the second access method is a method of making access along the arrangement of raster data of each image. FIG. 13 typically shows the inside of the memory 110 as with FIG. 7.

In the example illustrated in FIG. 13, the block size is data corresponding to one horizontal row (1 row×4 banks) shown in FIG. 13. The second image processing section 440 reads image data while incrementing a bank number in each block to one read processing. In FIG. 13, arrows indicated by solid lines indicate the access order of the read unit 442. Further, arrows indicated by broken lines indicate logical addresses at which the access of the read unit 442 is transitioned.

When a read start logical address is instructed, the read unit 442 of the second image processing section 440 reads image data stored in a row number included in the read start logical address. Then, the read unit 442 reads image data of the next bank number, which is stored in the same row number. Further, the read unit 442 reads image data of all bank numbers, which are stored in the same row number, while incrementing the bank number. When the reading of the image data stored in the same row number is completed, the read unit 442 is transitioned to the next row number, where it reads image data at such a row number in the same manner.

In the example of FIG. 13, the read unit 442 starts reading from a memory 411 of a bank0 and a row0. Then, when the reading of image data stored in the memory of the bank0 and row0 is completed, the read unit 442 increments the bank number and reads image data stored in a memory of a bank1 and the row0. When the reading of image data at a bank3 and the row0 is completed, the read unit 442 is transitioned to a row number 1, where it reads image data stored in a memory of the bank0 and the row0. Lastly, the read unit 442 sequentially reads the image data in this manner and reads image data stored in a memory 412 of the bank3 and a row65535.

Figure 14:
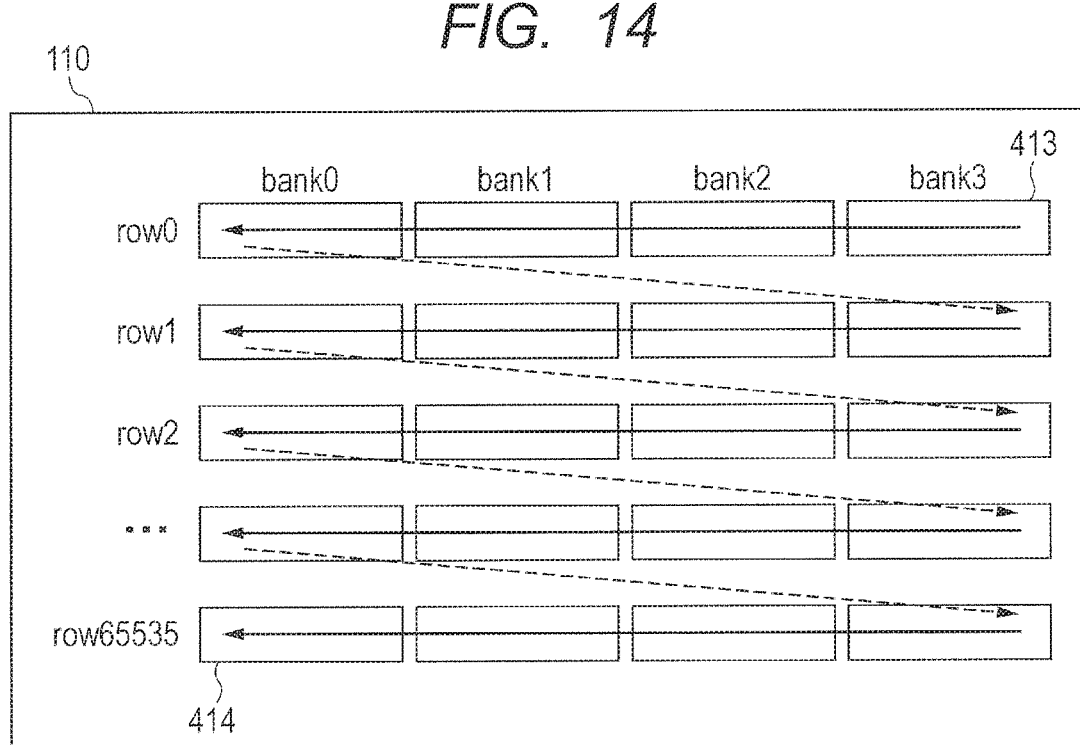
FIG. 14 is a typical diagram showing the transition of logical addresses when a first image processing section 430 reads image data by a third access method.

The transition of logical addresses read by the first image processing section 430 will next be described while referring to FIG. 14. FIG. 14 is a typical diagram showing the transition of logical addresses when the first image processing section 430 reads image data by the third access method. In the example shown in FIG. 14, a block size is data (1 row×4 banks) corresponding to one horizontal row shown in FIG. 14. The first image processing section 430 read image data while decrementing the bank number in each block with respect to one read processing.

When a read start logical address is instructed, the read unit 432 of the first image processing section 430 reads image data stored in a row number included in the read start logical address. Then, the read unit 432 reads image data of the next bank number, which is stored in the same row number. Further, the read unit 432 reads image data of all bank numbers, which are stored in the same row number, while decrementing the bank number. When the reading of the image data stored in the same row number is completed, the read unit 432 is transitioned to the next row number, where it reads image data at such a row number in the same manner.

In the example of FIG. 14, the read unit 432 starts reading from a memory 413 of a bank3 and a row0. Then, when the reading of image data stored in the memory of the bank3 and row0 is completed, the read unit 432 decrements the bank number and reads image data stored in a memory of a bank2 and the row0. When the reading of image data at a bank0 and the row0 is completed, the read unit 432 is transitioned to a row number 1, where it reads image data stored in a memory of the bank3 and the row1. Lastly, the read unit 432 sequentially reads the image data in this manner and reads image data stored in a memory 414 of the bank0 and a row65535.

Figure 15:
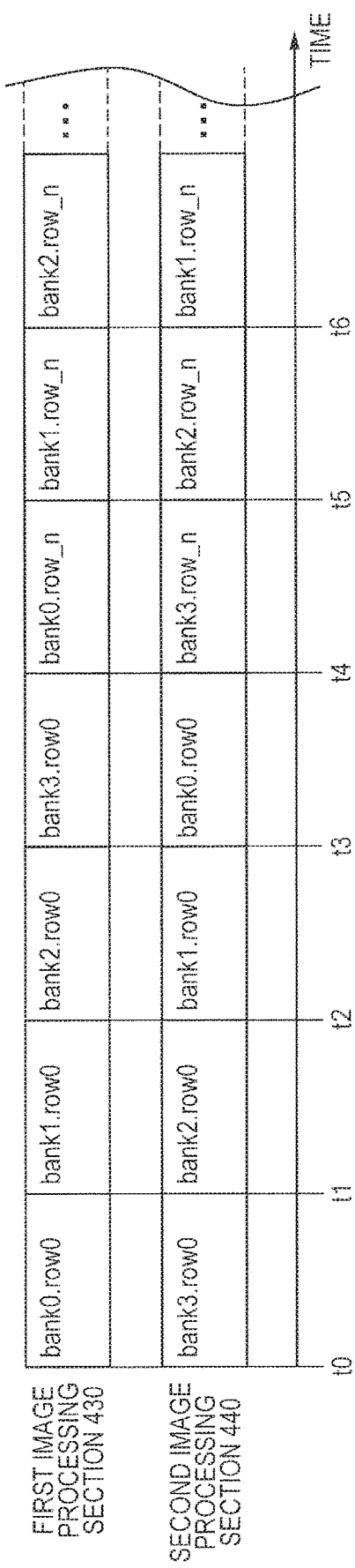
FIG. 15 is a diagram for describing access states of the first image processing section 430 and the second image processing section 440.

Next, the access states of the first and second image processing sections 430 and 440 will be described while referring to FIG. 15. FIG. 15 is a diagram for describing the access states of the first image processing section 430 and the second image processing section 440. In FIG. 15, the horizontal axis indicates the time. That is, FIG. 15 illustrates to which logical address each of the first image processing section 430 and the second image processing section 440 obtains access.

At times t0 to t1, the first image processing section 430 accesses a bank0 and a row0. On the other hand, the second image processing section 440 accesses a bank3 and the row0. Next, at the times t1 to t2, the first image processing section 430 accesses a bank1 and the row0. On the other hand, the second image processing section 440 accesses a bank2 and the row0.

At the times t0 to t4, the first image processing section 430 accesses image data of the row0 while incrementing the bank number. At the times t0 to t4, the second image processing section 440 accesses image data of the row0 while decrementing the bank number. As a result, no bank conflict occurs between the first and second image processing sections 430 and 440 which are accessing to the same row number. Likewise, after the time t4, the first image processing section 430 and the second image processing section 440 accesses a row number n while avoiding the bank conflict.

With the adoption of such a configuration, when a plurality of read units perform read access to image data having common profile information, they are capable of accessing while avoiding the bank conflict. According to the embodiment 3 as described above, it is possible to provide a semiconductor device which suppresses a delay in processing.

Embodiment 4

Figure 16:
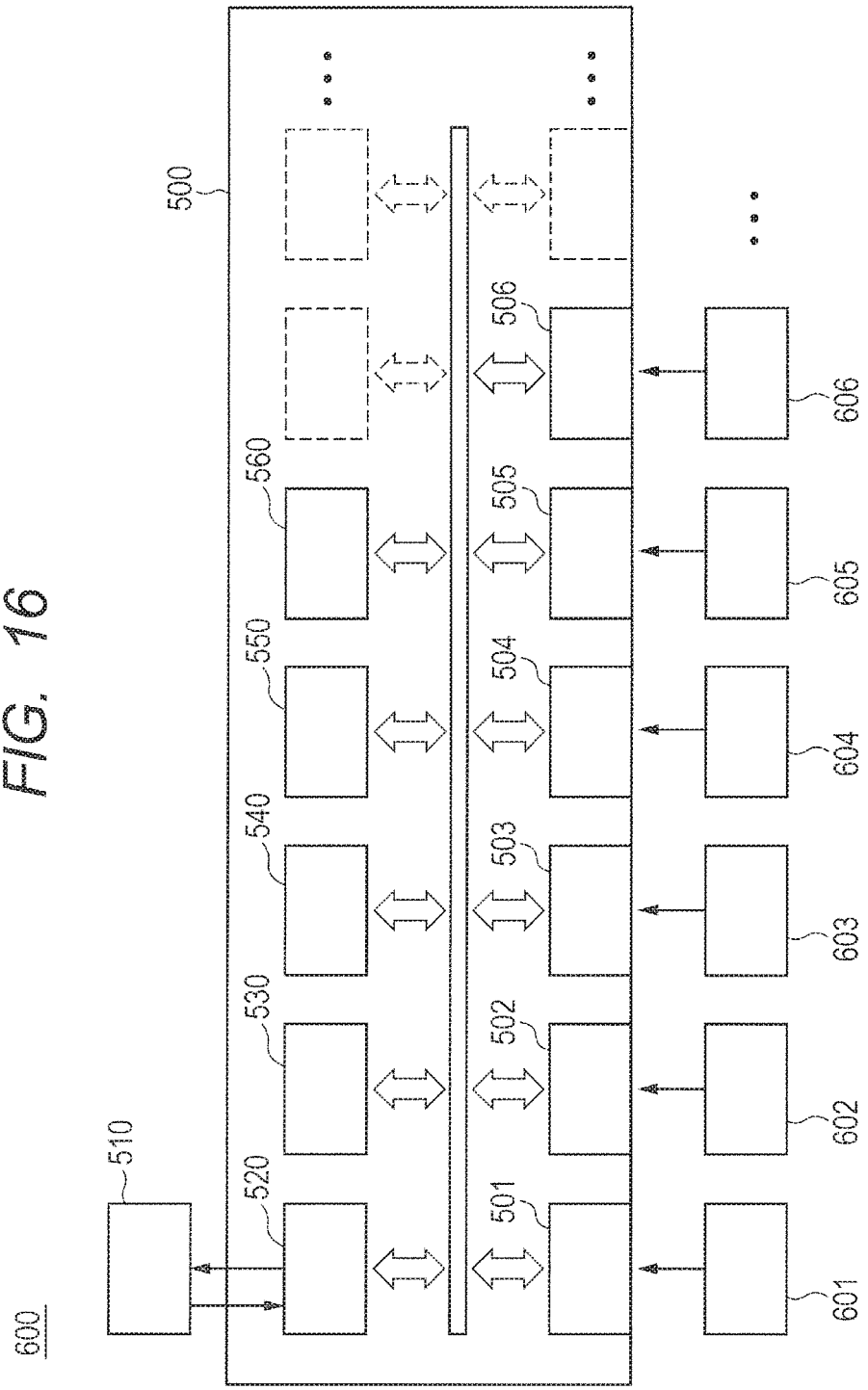
FIG. 16 is a block diagram of an image processing system according to an embodiment 4.

An embodiment 4 will next be described while referring to FIG. 16. FIG. 16 is a block diagram of an image processing system according to the embodiment 4. The image processing system 600 according to the embodiment 4 shown in FIG. 16 is an image processing system including either one of the semiconductor devices according to the above-described embodiments 1 through 3. The image processing system 600 is equipped with a plurality of cameras, a plurality of television tuners, and a plurality of display units. The image processing system 600 performs synthetic processing on a plurality of images stored in a memory in parallel by a plurality of image processing sections included in the semiconductor device.

The image processing system 600 is equipped with a memory 510, a semiconductor device 500, a first camera 601, a first television tuner 602, a first display unit 603, a second camera 604, a second television tuner 605, a second display unit 606, etc.

The first camera 601, the first television tuner 602, the second camera 604, and the second television tuner 605 are devices which respectively generate images. The first camera 601, the first television tuner 602, the second camera 604, and the second television tuner 605 respectively output the generated images to the semiconductor device 500.

The semiconductor device 500 has a memory controller 520, a CPU 560, a first image processing section 530, a second image processing section 540, an access method instructing section 550, etc., which are connected to the memory 510. Further, the semiconductor device 500 has a first camera input interface 501, a first tuner interface 502, a first display interface 503, a second camera input interface 504, a second tuner interface 505, and a second display interface 506, etc.

For example, the image processing system 600 stores the images respectively input from the first camera 601, the first television tuner 602, and the second camera 604 in the memory 510. Then, the semiconductor device 500 synthesizes these images stored in the memory 510 and icon data stored in the memory 510 in advance. At this time, for example, the first image processing section 530 synthesizes image data acquired from the first camera 601, image data acquired from the first television tuner 602, and an icon A stored in the memory 510. At the same time, the second image processing section 540 synthesizes image data acquired from the first camera 601, image data acquired from the second television tuner 605, and an icon B stored in the memory 510.

By using the semiconductor device described in the above-described embodiment in such a system, the adoption of such a configuration enables accessing to the memory 510 while avoiding bank conflict. Thus, according to the embodiment 4, there can be provided an image processing system which suppresses a delay in processing.

Although the invention made above by the present inventors has been described specifically on the basis of the preferred embodiments, the present invention is not limited to the already-described embodiments. It is needless to say that various changes can be made thereto within the scope not departing from the gist thereof.

Some or all of the above embodiments can be also described as in the following appendices, but are not limited to the following.

(Appendix 1)

A semiconductor device includes:

a plurality of read units which read data stored in a memory having a plurality of banks across the banks; and an access method managing section which, when one of the read units reads the data, determines a read start bank number being a bank number to start reading according to operation situations of the read units excepting the one read unit, and instructs the determined read start bank number to the one read unit.

(Appendix 2)

The semiconductor device described in the appendix 1, in which the access method managing section determines as the read start bank number, a bank number different from the bank number to which each of the read units excepting the one read unit is accessing.

(Appendix 3)

The semiconductor device described in the appendix 2, further includes a memory configuration information storage unit which stores memory configuration information of the memory and a read start logical address for the data therein, in which the read unit determines a logical address to access the memory according to the read start bank number, the memory configuration information, and the read start logical address.

(Appendix 4)

The semiconductor device described in the appendix 3, in which the read unit sequentially performs the operations of, when the read start bank number is instructed, reading the data stored in the bank of the read start bank number, and after the read unit finishes reading of the data, reading the data stored in a bank of a bank number different from the bank number subjected to the completion of the reading.

(Appendix 5)

The semiconductor device described in the appendix 1, in which the data is image data, and in which the access method managing section further instructs to each of the read units, either one of a first access method of sequentially performing the operations of reading the data stored in a bank of a read start bank number, and after the completion of the reading of the data stored in the bank of the bank number, reading the data stored in a bank of a bank number different from the bank number subjected to the completion of the reading, and a second access method of sequentially performing a read operation from the data to start reading along an image raster direction.

(Appendix 6)

The semiconductor device described in the appendix 5, further includes:

a display interface unit for outputting the data to a display unit; and a write unit which writes the data into the memory, in which the access method managing section selects the access method according to whether a destination to output data read by the one read unit is the display interface unit or the write unit.

(Appendix 7)

The semiconductor device described in the appendix 6, in which when the destination to output the data read by the one read unit is the write unit, the access method managing section determines the first access method, and in which when the destination to output the data read by the one read unit is the display interface unit, the access method managing section determines the second access method.

(Appendix 8)

The semiconductor device described in the appendix 5, in which when the one read unit is started up, the access method managing section determines the access method for the one read unit according to an access method for the memory, which is executed by each of the read units excepting the one read unit.

(Appendix 9)

The semiconductor device described in the appendix 5, in which when the access methods executed by the read units excepting the one read unit include the second access method upon start-up of the one read unit, the access method managing section determines the first access method with respect to the one read unit.

(Appendix 10)

The semiconductor device described in the appendix 3, in which the read units include a first read unit and a second read unit, and in which the access method managing section instructs the first read unit to read the data while incrementing the bank number and further instructs the second read unit to read the data while decrementing the bank number.

(Appendix 11)
A data processing system includes:
a data generating device which generates the data;
the memory in which the data is stored; and
the semiconductor device described in the appendix 1.

(Appendix 12)
A data reading method includes the steps of:
providing a plurality of read units which read data stored in a memory having a plurality of banks across the banks;
when one of the read units reads the data, determining a read start bank number being a bank number to start reading according to operation situations of the read units excepting the one read unit; and
instructing the determined read start bank number to the one read unit.

(Appendix 13)
The data reading method described in the appendix 12, includes the step of executing the read start bank number determining processing of determining as the read start bank number, a bank number different from the bank number to which each of the read units excepting the one read unit is accessing.

(Appendix 14)
The data reading method described in the appendix 13, includes the steps of:
further storing memory configuration information of the memory and a read start logical address for the data; and
determining a logical address to access the memory according to the read start bank number, the memory configuration information, and the read start logical address.

(Appendix 15)
The data reading method described in the appendix 14, includes the step of causing the read unit to sequentially perform the processing of, when the read start bank number is instructed, reading the data stored in the bank of the read start bank number, and after the read unit finishes reading of the data, reading the data stored in a bank of a bank number different from the bank number subjected to the completion of the reading.

(Appendix 16)
The data reading method described in the appendix 12, in which the data is image data, the method includes the steps of:
instructing to each of the read units, either one of a first access method of sequentially performing the processing of reading the data stored in a bank of a read start bank number, and after the completion of the reading of the data stored in the bank of the bank number, reading the data stored in a bank of a bank number different from the bank number subjected to the completion of the reading, and a second access method of sequentially performing read processing from the data to start reading along an image raster direction.

(Appendix 17)
The data reading method described in the appendix 16, in which, in the read unit, there is a case in which the data is output to a display interface unit or a case in which the data is output to a write unit which write the data into the memory, the method includes the steps of:
determining the access method according to whether a destination to output the data is the display interface unit or the write unit.

(Appendix 18)
The data reading method described in the appendix 17, includes the steps of:
defining the access method instructed to the read unit to be the first access method when the destination to output the data read by the one read unit is the write unit; and
defining the access method instructed to the read unit to be the second access method when the destination to output the data read by the one read unit is the display interface unit.

(Appendix 19)
The data reading method described in the appendix 14, includes the step of determining the access method for the one read unit according to an access method for the memory, which is executed by each of the read units excepting the one read unit.

(Appendix 20)
The data reading method described in the appendix 17, includes the step of, when the access methods executed by the read units excepting the one read unit include the second access method upon start-up of the one read unit, determining the access method for the one read unit to be the first access method.

(Appendix 21)
The data reading method described in the appendix 12, in which the read units include a first read unit and a second read unit, the method includes the steps of:
instructing the first read unit to read the data while incrementing the bank number and the second read unit to read the data while decrementing the bank number.

(Appendix 22)
A data reading program includes the steps of:
causing a computer to store memory configuration information of a memory having data stored therein;
causing the computer to provide a plurality of read units reading the data stored in the memory;
causing the computer to determine when one of read units reads the data, a read start logical address being a logical address to start reading according to the memory configuration information and operation situations of the read units excepting the one read unit; and
causing the computer to instruct the determined read start logical address to the one read unit.

(Appendix 23)
The data reading program described in the appendix 22, includes the steps of:
causing profile information of the data to be further stored; and
causing the read start logical address to be determined according to the memory configuration information, the operation situations of the read units excepting the one read unit, and the profile information.

(Appendix 24)
The data reading program described in the appendix 23, in which the memory has a plurality of banks, the logical address includes a bank number indicating which bank in the banks is given, the method includes the steps of:
determining the read start logical address to be a logical address including a bank number different from the bank number to which each of the read units excepting the one read unit is accessing.

(Appendix 25)
The data reading program described in the appendix 24, includes the step of:
sequentially performing processing of, when the read start logical address is instructed to the read unit, reading the data of the bank number included in the read start logical address and reading the data of the next bank number after the reading of the data of the bank number is finished.

(Appendix 26)
The data reading program described in the appendix 22, in which the data is image data, the program includes the steps of:

instructing to each of the read units, either one of a first access method of sequentially performing the operations of reading the data of a bank number included in a read starting logical address and after the completion of the reading of the data of the bank number, reading the data of the next bank number, and a second access method of sequentially performing the operation of reading the data along an image raster direction from the data to start reading.

(Appendix 27)

The data reading program described in the appendix 26, in which in the read unit, there is a case in which the data is output to a display interface unit or a case in which the data is output to a write unit which write the data into the memory, the program includes the steps of:

determining the access method according to whether a destination to output the data is the display interface unit or the write unit.

(Appendix 28)

The data reading program described in the appendix 27, includes the steps of:

defining the access method instructed to the read unit to be the first access method when the destination to output the data read by the one read unit is the write unit; and defining the access method instructed to the read unit to be the second access method when the destination to output the data read by the one read unit is the display interface unit.

(Appendix 29)

The data reading program described in the appendix 24, includes the step of, when the one read unit is started up, determining the access method for the one read unit according to an access method for the memory, which is executed by each of the read units excepting the one read unit.

(Appendix 30)

The data reading program described in the appendix 27, includes the step of, when the access methods executed by the read units excepting the one read unit include the second access method upon start-up of the one read unit, determining the access method for the one read unit to be the first access method.

(Appendix 31)

The data reading program described in the appendix 22, in which the read units include a first read unit and a second read unit, includes the steps of:

instructing the first read unit to read the data while incrementing the bank number and the second read unit to read the data while decrementing the bank number.

What is claimed is:

1. A semiconductor device comprising:
a plurality of read units that reads data stored across a plurality of banks of a memory, wherein each of the read units includes an access method register, wherein the access method register stores, as an in-access bank number, a bank number of a bank being accessed by the read unit; and
an access method managing section that, when one read unit of the plurality of read units reads the data, determines a read start bank number being a bank number of a bank for the one read unit to start reading the data from based on the in-access bank number stored in the access method register of each of one or more remaining read units of the plurality of read units so that the read start bank number differs from the in-access bank number stored in the access method register of each of one or more remaining read units of the plurality of read units, and provides the determined read start bank number to the one read unit.

2. The semiconductor device according to claim 1, further comprising a memory configuration information storage unit which stores memory configuration information of the memory and a read start logical address for the data therein,
wherein the one read unit determines a logical address to access the memory according to the read start bank number, the memory configuration information, and the read start logical address.

3. The semiconductor device according to claim 2, wherein the one read unit sequentially performs operations of:
when the read start bank number is provided to the one read unit, reading the data stored in a bank corresponding to the determined read start bank number; and
after the one read unit finishes reading of the data of the bank corresponding to the determined read start bank number, reading the data stored in a bank corresponding to a bank number different from the bank corresponding to the determined read start bank number.

4. The semiconductor device according to claim 2,
wherein the read units include a first read unit and a second read unit, and
wherein the access method managing section instructs the first read unit to read the data while incrementing the bank number and further instructs the second read unit to read the data while decrementing the bank number.

5. The semiconductor device according to claim 1,
wherein the data is image data, and
wherein the access method managing section further instructs each of the read units to read the data according to either one of 1) a first access method of sequentially performing operations of reading the data stored in a bank of a read start bank number, and after the completion of the reading of the data stored in the bank of the bank number, reading the data stored in a bank of a bank number different from the read start bank number, and 2) a second access method of sequentially performing a read operation from the image data to start reading along an image raster direction.

6. The semiconductor device according to claim 5, further comprising:
a display interface unit for outputting the data to a display unit; and
a write unit which writes the data into the memory,
wherein the access method managing section selects one of the first access method and the second access method according to whether a destination to output image data read by the one read unit is the display interface unit or the write unit.

7. The semiconductor device according to claim 6,
wherein when the destination to output the data read by the one read unit is the write unit, the access method managing section determines the first access method, and
wherein when the destination to output the data read by the one read unit is the display interface unit, the access method managing section determines the second access method.

8. The semiconductor device according to claim 5, wherein when the one read unit is started up, the access method managing section determines the access method for the one read unit according to an access method for the memory being executed by each of the one or more remaining read units of the plurality of read units.

9. The semiconductor device according to claim 5, wherein when the access methods executed by the one or more remaining read units of the plurality of read units include the second access method upon start-up of the one read unit, the access method managing section instructs the one read unit to perform reading of the data based on the first access method.

10. A data processing system comprising:
the semiconductor device according to claim 1;
a data generating device which generates the data; and
the memory in which the data is stored.

11. A data reading method comprising the steps of:
providing a plurality of read units that reads data stored across a plurality of banks of a memory, wherein each of the read units includes an access method register, wherein the access method register stores, as an in-access bank number, a bank number of a bank being accessed by the read unit;
when one of the read units reads the data, determining a read start bank number being a bank number of a bank for the one read unit to start reading the data from based on the in-access bank number stored in the access method register of each of one or more remaining read units of the plurality of read units so that the read start bank number differs from the in-access bank number stored in the access method register of each of one or more remaining read units of the plurality of read units; and
providing the determined read start bank number to the one read unit.

12. The data reading method according to claim 11, comprising the steps of:
further storing memory configuration information of the memory and a read start logical address for the data; and
determining a logical address to access the memory according to the read start bank number, the memory configuration information, and the read start logical address.

13. The data reading method according to claim 12, comprising the step of causing the read unit to sequentially perform processing of:
when the read start bank number is provided to the one read unit, reading the data stored in a bank corresponding to the determined read start bank number; and
after the one read unit finishes reading of the data of the bank corresponding to the determined read start bank number, reading the data stored in a bank corresponding to a bank number different from the bank corresponding to the determined read start bank number.

14. The data reading method according to claim 12, wherein the read units includes a first read unit and a second read unit,
the method comprising the steps of:
instructing the first read unit to read the data while incrementing the bank number and the second read unit to read the data while decrementing the bank number.

15. The data reading method according to claim 11, wherein the data is image data, the method comprising the steps of:
instructing each of the read units to read the data according to either one of 1) a first access method of sequentially performing operations of reading the data stored in a bank of a read start bank number, and after the completion of the reading of the data stored in the bank of the bank number, reading the data stored in a bank of a bank number different from the read start bank number, and 2) a second access method of sequentially performing a read operation from the image data to start reading along an image raster direction.

16. The data reading method according to claim 15, wherein, in the one read unit, the data is output to a display interface unit or output to a write unit which write the data into the memory,
the method comprising the steps of:
selecting one of the first access method and the second access method according to whether a destination to output the data is the display interface unit or the write unit.

17. The data reading method according to claim 16, comprising the steps of:
the one read unit performs data reading using the first access method when the destination to output the data read by the one read unit is the write unit; and
the one read unit performs data reading using the second access method when the destination to output the data read by the one read unit is the display interface unit.

18. A non-transitory computer readable storage medium for data reading, comprising the steps of:
providing a plurality of read units that reads data stored across a plurality of banks of a memory, wherein each of the read units includes an access method register, wherein the access method register stores, as an in-access bank number, a bank number of a bank being accessed by the read unit;
when one read unit of the plurality of read units reads the data, determines a read start bank number being a bank number of a bank for the one read unit to start reading the data from based on the in-access bank number stored in the access method register of each of one or more remaining read units of the plurality of read units so that the read start bank number differs from the in-access bank number stored in the access method register of each of one or more remaining read units of the plurality of read units; and
providing the determined read start bank number to the one read unit.

* * * * *